(12) United States Patent
Sugimura et al.

(10) Patent No.: US 11,656,014 B2
(45) Date of Patent: May 23, 2023

(54) HEAT EXCHANGER

(71) Applicant: DENSO CORPORATION, Kariya (JP)

(72) Inventors: Ryohei Sugimura, Kariya (JP); Masaaki Kawakubo, Kariya (JP); Daiki Kato, Kariya (JP); Hiroshi Mieda, Kariya (JP); Tetsuya Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 17/098,487

(22) Filed: Nov. 16, 2020

(65) Prior Publication Data

US 2021/0063067 A1 Mar. 4, 2021

Related U.S. Application Data

(62) Division of application No. 16/091,138, filed as application No. PCT/JP2017/013975 on Apr. 3, 2017, now abandoned.

(30) Foreign Application Priority Data

| Apr. 8, 2016 | (JP) | ................................. 2016-078224 |
| Dec. 2, 2016 | (JP) | ................................. 2016-234961 |

(51) Int. Cl.
*F25B 43/00* (2006.01)
*F25B 5/04* (2006.01)
(Continued)

(52) U.S. Cl.
CPC .............. *F25B 43/006* (2013.01); *F25B 5/04* (2013.01); *F25B 6/04* (2013.01); *F25B 39/00* (2013.01);
(Continued)

(58) Field of Classification Search
CPC .............. F25B 43/006; F25B 2339/044; F25B 2339/0444; F25B 2400/23; B01D 45/04; B01D 45/12
See application file for complete search history.

(56) References Cited

U.S. PATENT DOCUMENTS

| 4,187,695 A | 2/1980 | Schumacher |
| 4,199,960 A | 4/1980 | Adams et al. |
(Continued)

FOREIGN PATENT DOCUMENTS

| JP | H03067874 U | 7/1991 |
| JP | 2000213826 A | 8/2000 |
(Continued)

OTHER PUBLICATIONS

U.S. Appl. No. 16/091,138, filed Oct. 4, 2018, Ryohei Sugimura.

*Primary Examiner* — Christopher R Zerphey
(74) *Attorney, Agent, or Firm* — Harness, Dickey & Pierce, P.L.C.

(57) ABSTRACT

A heat exchanger includes a heat exchanging portion, a reservoir that performs gas-liquid separation on a gas-liquid two-phase refrigerant that flows out from the heat exchanging portion into a gas-phase refrigerant and a liquid-phase refrigerant and stores the liquid-phase refrigerant, and an inflow passage that allows the gas-liquid two-phase refrigerant flowing out from the heat exchanging portion to flow into the reservoir. The inflow passage is connected so as to be in communication with an inlet port of the reservoir which is disposed above a liquid surface of the liquid-phase refrigerant stored in the reservoir.

8 Claims, 18 Drawing Sheets

(51) Int. Cl.
*F25B 6/04* (2006.01)
*F25B 39/00* (2006.01)
*F25B 40/00* (2006.01)
*F25B 39/04* (2006.01)

(52) U.S. Cl.
CPC .............. *F25B 40/00* (2013.01); *F25B 39/04* (2013.01); *F25B 2339/047* (2013.01); *F25B 2400/16* (2013.01); *F25B 2400/23* (2013.01)

(56) References Cited

U.S. PATENT DOCUMENTS

| | | | |
|---|---|---|---|
| 5,787,729 A | 8/1998 | Wijaya | |
| 6,006,532 A | 12/1999 | Suzuki et al. | |
| 7,086,248 B2 | 8/2006 | Sakai et al. | |
| 7,401,599 B2 * | 7/2008 | Saito | B04C 5/185 |
| | | | 123/518 |
| 7,461,519 B2 | 12/2008 | Fralick et al. | |
| 8,147,575 B2 * | 4/2012 | Lucas | F04C 29/026 |
| | | | 55/447 |
| 10,391,839 B2 | 8/2019 | Kawakubo et al. | |
| 2005/0081559 A1 | 4/2005 | McGregor et al. | |
| 2009/0241573 A1 | 10/2009 | Ikegami et al. | |
| 2016/0361976 A1 | 12/2016 | Napoli et al. | |

FOREIGN PATENT DOCUMENTS

| | | |
|---|---|---|
| JP | 2001289539 A | 10/2001 |
| JP | 2004069272 A | 3/2004 |
| JP | 2009174836 A | 8/2009 |
| JP | 2011152827 A | 8/2011 |
| JP | 2012241962 A | 12/2012 |
| JP | 2014149123 A | 8/2014 |
| WO | WO-2015128807 A2 | 9/2015 |

* cited by examiner

HEAT EXCHANGER

CROSS REFERENCE TO RELATED APPLICATIONS

This application is a divisional application of Ser. No. 16/091,138 filed Oct. 4, 2018 which is a U.S. National Phase Application under 35 U.S.C. 371 of International Application No. PCT/JP2017/013975 filed on Apr. 3, 2017. These applications are based on and claim the benefit of priority from Japanese Patent Application No. 2016-078224 filed on Apr. 8, 2016 and Japanese Patent Application No. 2016-234961 filed on Dec. 2, 2016. The entire disclosures of all of the above applications are incorporated herein by reference.

TECHNICAL FIELD

The present disclosure relates to a heat exchanger.

BACKGROUND ART

Conventionally, for example as described in Patent Document 1 below, a refrigeration cycle device which uses this type of heat exchanger is known. The refrigeration cycle device described in Patent Document 1 includes a gas-liquid separator for separating a refrigerant into a gas-phase refrigerant and a liquid-phase refrigerant, and a switching means for switching a refrigerant circuit, in which a refrigerant circulates, between a refrigerant circuit of a first mode and a refrigerant circuit of a second mode. Specifically, the gas-liquid separator separates the refrigerant flowing out of an outside heat exchanger into a gas-phase refrigerant and a liquid-phase refrigerant, discharges the gas-phase refrigerant from a gas-phase refrigerant outlet, and discharges the liquid-phase refrigerant from a liquid-phase refrigerant outlet. Further, the refrigerant circuit of the first mode is a refrigerant circuit that causes the liquid-phase refrigerant to flow out from the liquid-phase refrigerant outlet of the gas-liquid separator and into a second pressure reducing means and an evaporator, and further causes the liquid-phase refrigerant to be sucked into a compressor. The refrigerant circuit of the second mode is a refrigerant circuit that causes the gas-phase refrigerant to flow out from the gas-phase refrigerant outlet of the gas-liquid separator and to be sucked into the compressor. According to the gas-liquid separator disclosed in Patent Document 1, the refrigerant is introduced from below.

PRIOR ART DOCUMENTS

Patent Documents

Patent Literature 1: JP 2014-149123 A

SUMMARY OF INVENTION

When refrigerant is introduced from the lower side of the gas-liquid separator as described in Patent Document 1, during a heating operation the gas-phase refrigerant is blown out into the liquid-phase refrigerant, and the liquid-phase refrigerant becomes mixed with the gas-phase refrigerant, the liquid surface of the liquid-phase refrigerant is not stabilized, and the gas-liquid separator may be unable to function as a reservoir.

It is an object of the present disclosure to provide a heat exchanger that can function as a reservoir by suppressing turbulence in the liquid surface of a reservoir.

According to the present disclosure, a heat exchanger for a refrigeration cycle includes a heat exchanging portion (34) that exchanges heat between a refrigerant passing through therein and air, a reservoir (36, 36A, 36B, 36C, 36D, 36E, 36F, 36G) that performs gas-liquid separation on a gas-liquid two-phase refrigerant that flows out from the heat exchanging portion into a gas-phase refrigerant and a liquid-phase refrigerant, the reservoir storing the liquid-phase refrigerant, an inflow passage (12) that allows the gas-liquid two-phase refrigerant flowing out from the heat exchanging portion to flow into the reservoir, a gas-phase outflow passage (13) that allows the gas-phase refrigerant to flow out from the reservoir, and a liquid-phase outflow passage (14) that allows the liquid-phase refrigerant to flow out from the reservoir. The inflow passage is connected so as to be in communication with an inlet port (81a) of the reservoir disposed above a liquid surface of the liquid-phase refrigerant stored in the reservoir, the gas-phase outflow passage is connected so as to be in communication with a gas-phase outlet port (81b) of the reservoir disposed above the liquid surface of the liquid-phase refrigerant stored in the reservoir, and the liquid-phase outflow passage is connected so as to be in communication with a liquid-phase outlet port (81c) of the reservoir disposed below the liquid surface of the liquid-phase refrigerant stored in the reservoir.

According to the present disclosure, since the refrigerant flows in from above the liquid surface, gas-phase refrigerant does not flow into the liquid-phase refrigerant stored in the reservoir, and it is possible to suppress disturbances in the liquid surface.

Furthermore, according to the present disclosure, a gas-phase outflow passage and a liquid-phase outflow passage are provided, and can function as both a receiver and an accumulator. In particular, when the inflow port is provided in the upper region when functioning as a receiver, the gas-liquid two-phase refrigerant flows from above, and it is necessary to address further problems caused by this.

Further, according to the present disclosure, the reservoir preferably includes a partition portion (82, 82B, 82C) between the inlet port and the gas-phase outlet port.

By providing a partition portion between the inlet port and the gas-phase outlet port, the refrigerant flowing in from the inlet port hits the partition portion before flowing out from the gas-phase outlet port, and continues downward. Therefore, it is possible to suppress the liquid-phase refrigerant from flowing out of the gas-phase outlet port.

Further, according to the present disclosure, a buffer portion (83, 83B, 83C) is preferably disposed between the inlet port and the liquid surface of the liquid-phase refrigerant.

In the case where the incoming refrigerant is substantially liquid-phase refrigerant, it hits the buffer portion and then continues toward the liquid surface. Therefore, the refrigerant does not directly hit the liquid surface of the liquid-phase refrigerant accumulated inside, and disturbances of the liquid surface can be suppressed.

Further, according to the present disclosure, the inflow passage is preferably disposed such that if a center line of the inflow passage is extended, the center line reaches an inner wall surface (816, 812Gb) of the reservoir (36D, 36E, 36F, 36G) without passing through a center (815, 812Ga) of the reservoir.

In the case where the incoming refrigerant is substantially liquid-phase refrigerant, it hits the inner wall surface of the reservoir and then continues toward the liquid surface. Therefore, the refrigerant does not directly hit the liquid surface of the liquid-phase refrigerant accumulated inside, and disturbances of the liquid surface can be suppressed.

It is noted that the reference numerals in parentheses described in "SUMMARY OF INVENTION" and "CLAIMS" indicate the correspondence relationship with "DESCRIPTION OF EMBODIMENTS" described later, and "SUMMARY OF INVENTION" and "CLAIMS" are not limited to "DESCRIPTION OF EMBODIMENTS".

DETAILED DESCRIPTION

Figure 1:
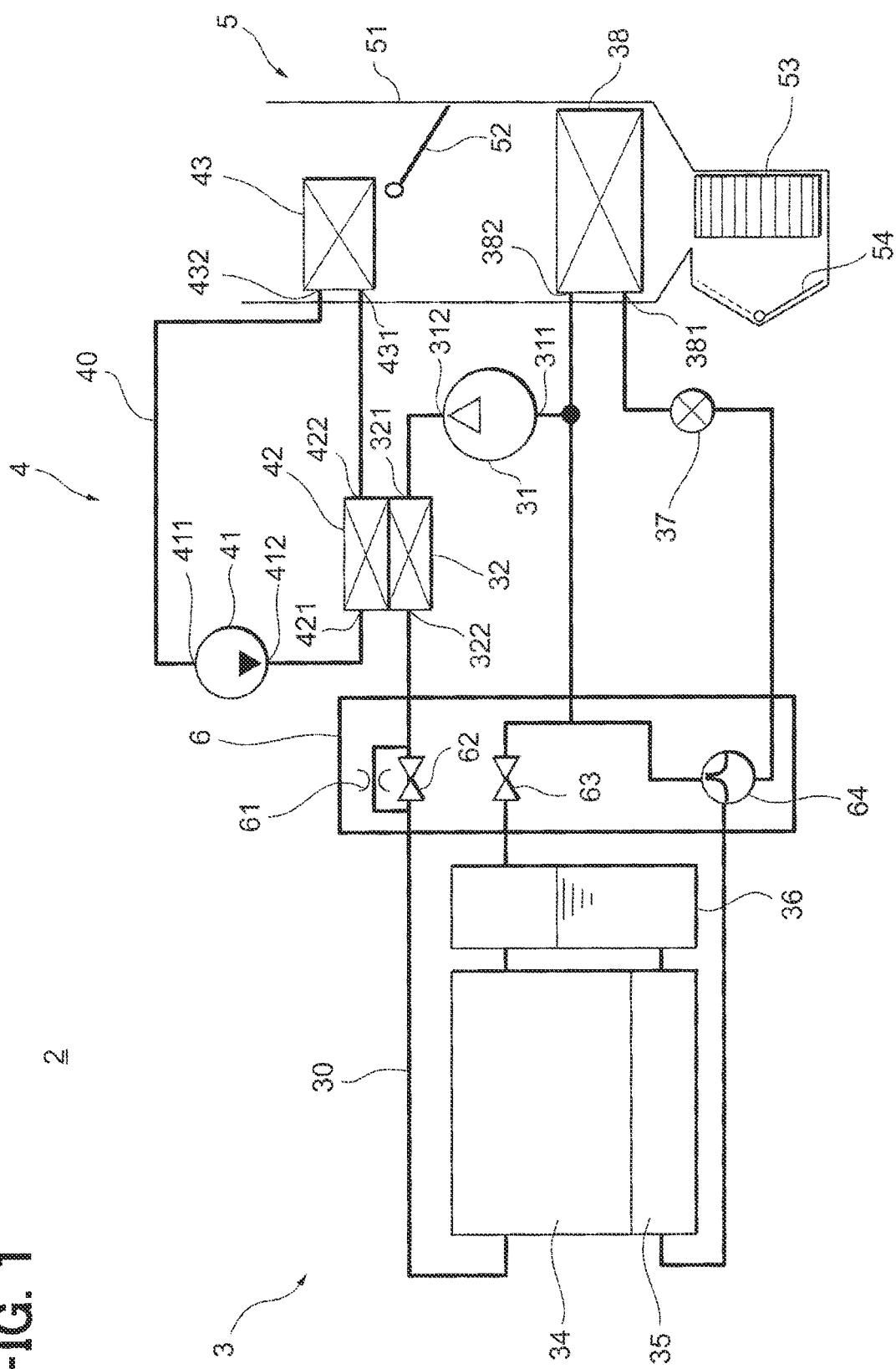
FIG. 1 is a view for explaining an example of a refrigeration cycle to which a heat exchanger according to each embodiment is applied.

Hereinafter, the present embodiments will be described with reference to the attached drawings. In order to facilitate the ease of understanding, the same reference numerals are attached to the same constituent elements in each drawing where possible, and redundant explanations are omitted.

As shown in FIG. 1, an integrated valve device 6 is used in a vehicle air conditioner 2 which is installed in a vehicle and which performs air conditioning in a passenger compartment. The vehicle air conditioner 2 includes a refrigeration cycle device 3, a water cycle device 4, and an air conditioning unit 5. The air conditioning unit 5 is a unit for blowing warm air or cold air into the passenger compartment. The refrigeration cycle device 3 and the water cycle device 4 are form a heat pump unit which adjusts the temperature of the air blown out from the air conditioning unit 5.

The refrigeration cycle device 3 and the integrated valve device 6 will be described. The refrigeration cycle device 3 includes a refrigerant flow passage 30, a compressor 31, a condenser 32, a first heat exchanger 34, a second heat exchanger 35, a reservoir 36, an expansion valve 37, an evaporator 38, and the integrated valve device 6. The first heat exchanger 34, the second heat exchanger 35, and the reservoir 36 correspond to the heat exchanger of the present invention.

The integrated valve device 6 includes a fixed throttle 61, a first valve 62, a second valve 64, and a third valve 63. The water cycle device 4 includes a water flow passage 40, a water pump 41, a water-side heat exchanger 42, and a heater core 43. The air conditioning unit 5 includes a casing 51, an air mix door 52, a blower fan 53, and an inside/outside air switching door 54.

The refrigerant flow passage 30 is a flow passage in which refrigerant flows, and connects the compressor 31, the condenser 32, the first heat exchanger 34, the second heat exchanger 35, the reservoir 36, the expansion valve 37, and the evaporator 38. Here, HFC refrigerant or HFO refrigerant, for example, may be used as refrigerant. Oil for lubricating the compressor 31 is mixed in the refrigerant.

The compressor 31 is an electric compressor and includes an suction port 311 and a discharge port 312. The compressor 31 sucks refrigerant from the suction port 311 and compresses the refrigerant. The compressor 31 discharges the refrigerant, which is in an overheated state due to being compressed, from the discharge port 312. The refrigerant discharged from the discharge port 312 flows into the condenser 32.

The condenser 32 is a conventional heat exchanger and includes an inlet port 321 and an outlet port 322. The condenser 32 is configured to exchange heat with the water-side heat exchanger 42. Since the condenser 32 and the water-side heat exchanger 42 are configured so as to be capable of exchanging heat with each other, they form a water-refrigerant heat exchanger. The high temperature and high pressure refrigerant discharged from the compressor 31 flows into the condenser 32 from the inlet port 321. The refrigerant, having flown into the condenser 32, exchanges heat with water flowing through the water-side heat exchanger 42, and flows out from the outlet port 322 in a lower temperature state. The refrigerant flowing out from the outlet port 322 then flows into the fixed throttle 61 and the first valve 62 which form a part of the integrated valve device 6.

When the first valve 62 is closed, the refrigerant is decompressed through the fixed throttle 61. As such, the pressure of the refrigerant is reduced, and this low pressure refrigerant flows into the first heat exchanger 34. Conversely, when the first valve 62 is opened, the refrigerant is not decompressed and flows into the first heat exchanger 34 as a high pressure refrigerant.

The first heat exchanger 34 is an outside heat exchanger disposed outside of the passenger compartment, and is configured heat exchange with outside air. The refrigerant that flows into the first heat exchanger 34 exchanges heat with the outside air and then flows into the reservoir 36.

The reservoir 36 separates gas-phase refrigerant from liquid-phase refrigerant, and stores the liquid-phase refrigerant. The separated gas-phase refrigerant then flows into the third valve 63. The gas-phase refrigerant that flows into the third valve 63 then flows toward the compressor 31 when the third valve 63 is opened. Conversely, the separated liquid-phase refrigerant is stored in the reservoir 36 and flows out toward the second heat exchanger 35.

The second heat exchanger 35 is an outside heat exchanger disposed outside of the passenger compartment, and is configured heat exchange with outside air. The second heat exchanger 35 further enhances the heat exchange efficiency of the refrigerant by cooperating with the first heat exchanger 34 to exchange heat between the incoming liquid-phase refrigerant and outside air. The refrigerant that flows out from the second heat exchanger 35 then flows into the second valve 64.

The second valve 64 is configured as a three-way valve that selectively allows the incoming refrigerant to flow toward either the compressor 31 or the expansion valve 37. The expansion valve 37 decompresses the incoming refrigerant and then discharges the refrigerant. The refrigerant discharged from the expansion valve 37 then flows toward the evaporator 38. The expansion valve 37 is a temperature-sensitive mechanical expansion valve that decompresses and expands the refrigerant flowing into the evaporator 38 such that the degree of superheating of the refrigerant discharged from the evaporator 38 falls within a predetermined range.

The evaporator 38 has an inlet port 381 and an outlet port 382. The refrigerant flowing toward the evaporator 38 flows into the evaporator 38 from the inlet port 381. Since the evaporator 38 is disposed in the casing 51, the evaporator 38 exchanges heat with the air flowing in the casing 51. The refrigerant flowing in the evaporator 38 exchanges heat with the air flowing in the casing 51 and then flows out from the outlet port 382 toward the compressor 31.

Next, the water cycle device 4 will be described. The water flow passage 40 is a flow passage in which water flows, and connects the water pump 41, the water-side heat exchanger 42, and the heater core 43. The water pump 41 has an inlet port 411 and a discharge port 412. The water pump 41 sucks in water from the inlet port 411 and discharges water from the discharge port 412. By driving the water pump 41, it is possible to form a flow of water in the water flow passage 40.

The water discharged from the discharge port 412 due to the operation of the water pump 41 flows toward the water-side heat exchanger 42. As described above, the water-side heat exchanger 42 and the condenser 32 form a water-refrigerant heat exchanger. The water-side heat exchanger 42 has an inlet port 421 and an outlet port 422. The water that flows into the water-side heat exchanger 42 from the inlet port 421 is heat exchanged with the refrigerant flowing through the condenser 32, and then flows out from the outlet port 422. Since the refrigerant flowing through the condenser 32 is a high temperature and high pressure refrigerant, the water flowing through the water side heat exchanger 42 is heated and then flows toward the heater core 43.

The heater core 43 is disposed in the casing 51 of the air conditioning unit 5. The heater core 43 is for exchanging heat with the air flowing in the casing 51. The heater core 43 has an inlet port 431 and an outlet port 432. Water which is heated by flowing through the water-side heat exchanger 42 flows into the inlet port 431. The water flowing into the heater core 43 exchanges heat with the air flowing in the casing 51. The water flowing in the heater core 43 is reduced in temperature and then flows out from the outlet port 432 toward the water pump 41.

Next, the air conditioning unit 5 will be described. The casing 51 forms a flow passage that carries the conditioned air that will flow into the passenger compartment. From an upstream side in the casing 51, the inside/outside air switching door 54, the blower fan 53, the evaporator 38, the air mix door 52, and the heater core 43 are arranged.

The inside/outside air switching door 54 is a door for switching between intaking the air flowing in the casing 51 from outside the passenger compartment or inside the passenger compartment. The blower fan 53 generates an air flow in the casing 51 and sends the conditioned air into the passenger compartment. The air mix door 52 is a door for switching between whether or not the air flowing in the casing 51 passes through the heater core 43.

The vehicle air conditioner 2 is configured to open and close the respective valves of the integrated valve device 6 to adjust the amount of refrigerant flowing through the refrigeration cycle device 3, to drive the water pump 41 to adjust the amount of water flowing through the water cycle device 4, and to drive the blower fan 53 to adjust the amount of air flowing through the air conditioning unit 5, thereby cooling or heating the passenger compartment.

Figure 2:
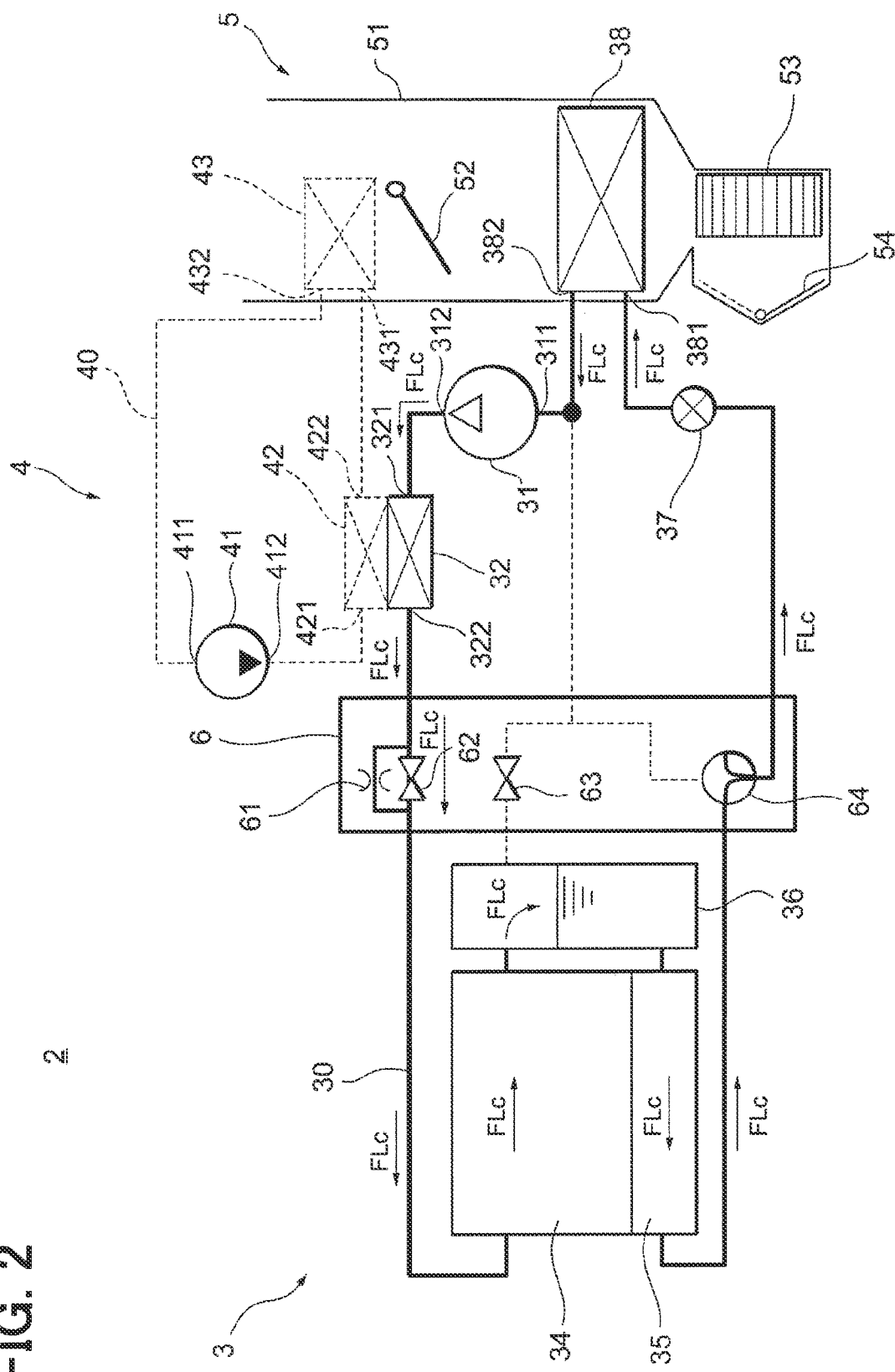
FIG. 2 is a view for explaining a case where the refrigeration cycle shown in FIG. 1 is operated in a cooling operation.

With reference to FIG. 2, the operation of the vehicle air conditioner 2 performing a cooling operation will be described. In FIG. 2, the flow of the refrigerant is indicated by FLc. During the cooling operation, the water pump 41 is not driven, and as such no water flow is generated in the water cycle device 4.

Accordingly, the high-temperature and high-pressure gas-phase refrigerant discharged from the compressor 31 flows toward the integrated valve device 6 without undergoing changes. During the cooling operation, the first valve 62 is in an open state. Accordingly, the refrigerant flowing from the condenser 32 flows toward the first heat exchanger 34 without being pressure reduced.

The high-temperature and high-pressure gas-phase refrigerant flowing into the first heat exchanger 34 is heat-exchanged with the outside air. As a result, the temperature of the refrigerant decreases, and the refrigerant is cooled into a gas-liquid two-phase refrigerant and flows out to the reservoir 36. During the cooling operation, the reservoir 36 mainly functions as a receiver that allows liquid-phase refrigerant to flow out. The third valve 63 is closed, and thus the liquid-phase refrigerant flows out from the reservoir 36 to the second heat exchanger 35.

During the cooling operation, the second heat exchanger 35 functions as a subcooler. The refrigerant flowing into the second heat exchanger 35 is further cooled through heat exchange with the outside air. During the cooling operation, the first heat exchanger 34 and the second heat exchanger 35 function as a condenser of the refrigeration cycle device 3.

The liquid-phase refrigerant that flows out from the second heat exchanger 35 then flows into the second valve 64. During the cooling operation, the second valve 64 is switched such that the incoming refrigerant is only allowed to flow toward the expansion valve 37. The refrigerant decompressed by the expansion valve 37 flows into the evaporator 38.

During the cooling operation, the blower fan 53 is driven, and the air mix door 52 is positioned so as to close the heater core 43 side. Therefore, the air flowing in the casing 51 is cooled through heat exchange with the low-temperature refrigerant in the evaporator 38. The cooled air flows in the casing 51 and is supplied into the passenger compartment.

Figure 3:
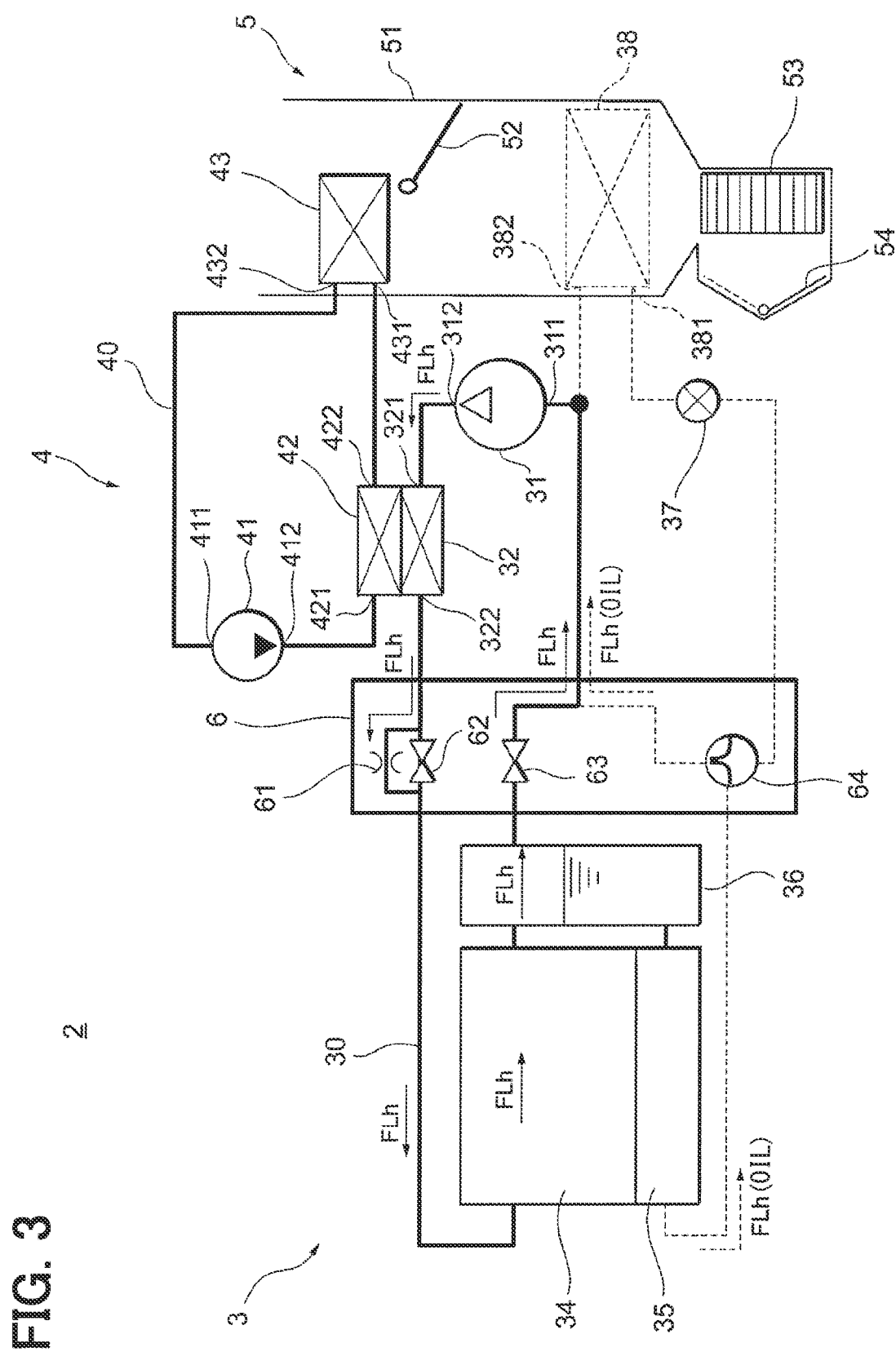
FIG. 3 is a view for explaining a case where the refrigeration cycle shown in FIG. 1 is operated in a heating operation.

With reference to FIG. 3, the operation of the vehicle air conditioner 2 performing a heating operation will be described. In FIG. 3, the flow of the refrigerant is indicated by FLh. During the heating operation, the water pump 41 is driven, and as such a water flow is generated in the water cycle device 4.

Therefore, the high-temperature and high-pressure gas-phase refrigerant discharged from the compressor 31 flows into in the condenser 32, at which point the refrigerant exchanges heat with the water flowing in the water-side heat exchanger 42 and is cooled. Then, the refrigerant flows toward the integrated valve device 6. During the heating operation, the first valve 62 is in a closed state.

Accordingly, the refrigerant flowing from the condenser 32 is pressure reduced, and then flows toward the first heat exchanger 34.

The low-pressure gas-liquid two-phase refrigerant flowing into the first heat exchanger 34 heat exchanges with the outside air and evaporates, and then flows out to the reservoir 36. In the case of the heating operation, the reservoir 36 mainly functions as an accumulator which allows gas-phase refrigerant to flow out. The third valve 63 is opened, and thus the gas-phase refrigerant flows out toward the compressor 31.

In the reservoir 36, the incoming refrigerant is separated into gas and liquid-phases, and the liquid-phase refrigerant is stored. The liquid-phase refrigerant flows out toward the second heat exchanger 35. The second valve 64 opens a flow passage toward the suction port 311, and so liquid-phase refrigerant and oil gradually return to the compressor 31.

During the heating operation, the blower fan 53 is driven, and the air mix door 52 is positioned so as to open the heater core 43 side. Therefore, the air flowing in the casing 51 is heated through heat exchange with high temperature water in the heater core 43. The heated air flows in the casing 51 and is supplied into the passenger compartment.

In the integrated valve device 6 of the present embodiment, the fixed throttle 61, the first valve 62, the second valve 64, and the third valve 63 are integrally formed, and may be housed inside the reservoir 36.

Figure 4:
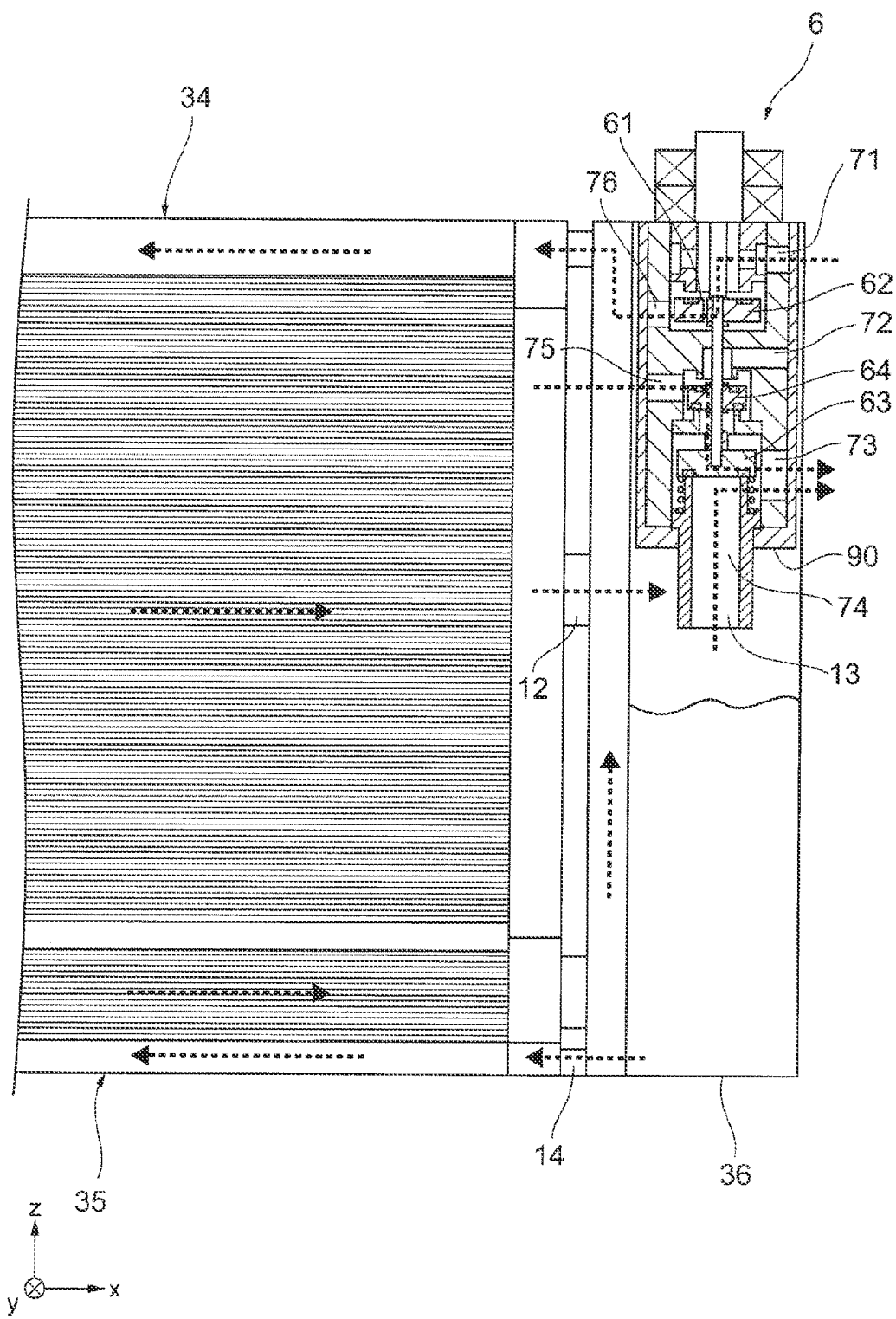
FIG. 4 is a view for further explaining the heat exchanger shown in FIG. 1.

As shown in FIG. 4, when the integrated valve device 6 is inserted into and positioned within the reservoir 36, an insertion end portion 90 is inserted to the lowest position. A fourth outlet port 74 is provided so as to extend downward from the insertion end portion 90. Since the first heat exchanger 34 and the second heat exchanger 35 are disposed on one side of the integrated valve device 6, the inlet port and outlet port of the integrated valve device 6 which allow refrigerant to be exchanged with the first heat exchanger 34 and the second heat exchanger 35 are disposed toward the side of the first heat exchanger 34 and the second heat exchanger 35. From this viewpoint, a first outlet port 76, through which refrigerant flows out to the first heat exchanger 34, is arranged above the first heat exchanger 34 side. A second inlet port 75, through which refrigerant flows in from the second heat exchanger 35, is disposed on the second heat exchanger 35 side and below the first outlet port 76. A first inlet port 71, A second outlet port 72, and A third outlet port 73 are provided an opposite side from the side that faces the first heat exchanger 34 and the second heat exchanger 35. An inflow passage 12, a gas-phase outflow passage 13, and a liquid-phase outflow passage 14 will be described next.

Figure 5:
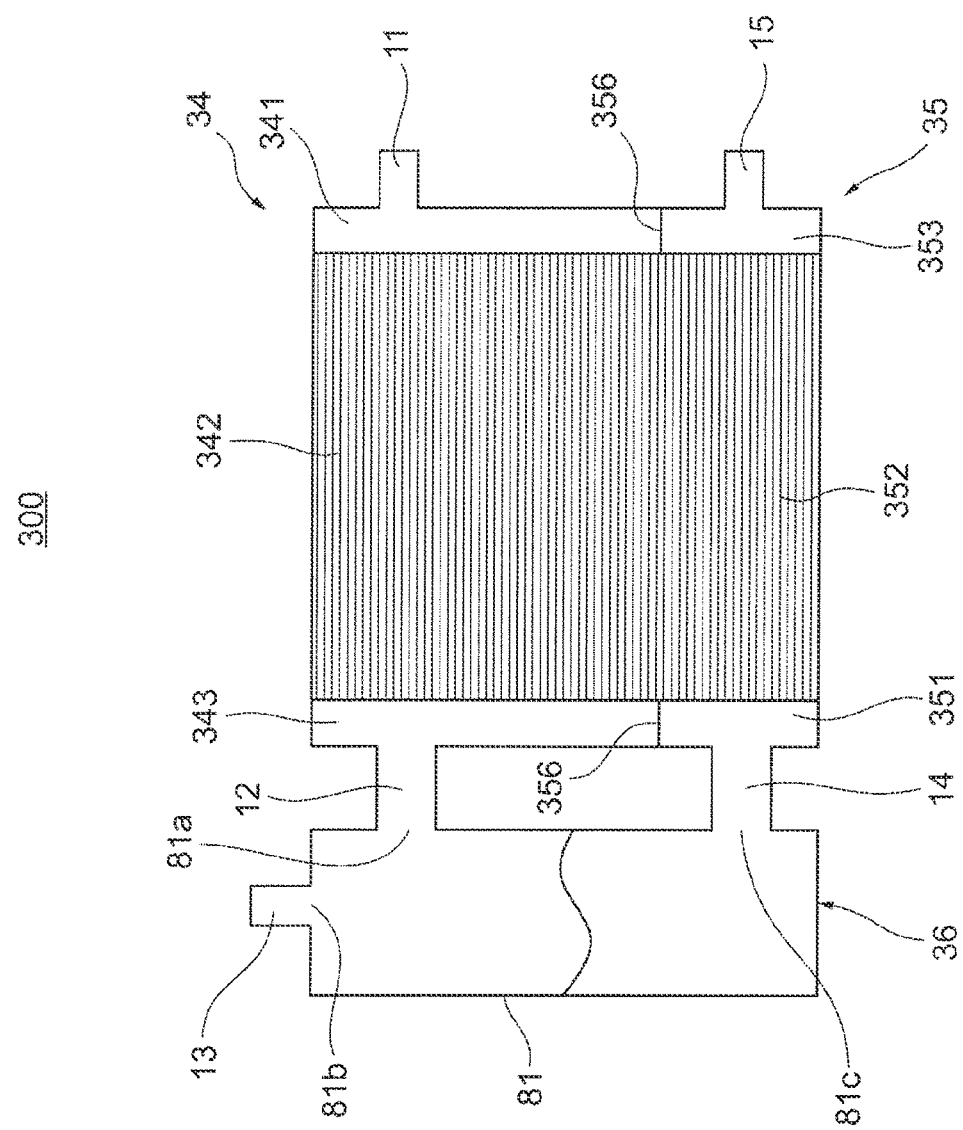
FIG. 5 is a view schematically showing a heat exchanger according to a first embodiment of the present invention.

A heat exchanger 300 according to a first embodiment of the present invention will be described with reference to FIG. 5. The heat exchanger 300 described with reference to FIG. 5 is described while simplifying the descriptions of the first heat exchanger 34, the second heat exchanger 35, and the reservoir 36 described with reference to FIGS. 1 to 4 above, and for the sake of convenience, explanations thereof are omitted except where necessary.

The heat exchanger 300 includes the first heat exchanger 34 that is an upstream heat exchanging portion, the second heat exchanger 35 that is a downstream heat exchanging portion, and the reservoir 36. The first heat exchanger 34 has an upstream core 342 and header tanks 341, 343. In the present embodiment, the illustrated example is provided with a single upstream core 342, but two or more cores may be used. The upstream core 342 is a part that exchanges heat between the refrigerant flowing therein and the air flowing outside, and includes tubes through which the refrigerant flows and fins provided between the tubes.

At the upstream side end of the upstream core 342, the header tank 341 is attached. At the downstream side end of the upstream core 342, the header tank 343 is attached.

An inflow passage 11 is provided in the header tank 341. An inflow passage 12 is provided in the header tank 343. The refrigerant flowing in from the inflow passage 11 flows into the upstream core 342 from the header tank 341. The refrigerant flowing through the upstream core 342 flows into the header tank 343. The refrigerant flowing into the header tank 343 flows out to the inflow passage 12. The inflow passage 12 is connected to the reservoir 36. The refrigerant flowing out to the inflow passage 12 flows into a main body portion 81 of the reservoir 36.

The reservoir 36 has the main body portion 81, the inflow passage 12, the liquid-phase outflow passage 14, and the gas-phase outflow passage 13. The main body portion 81 is a portion that separates the gas-liquid two-phase refrigerant flowing in from the inflow passage 12 into a liquid-phase refrigerant and a gas-phase refrigerant, and stores the liquid-phase refrigerant.

The inflow passage 12, the liquid-phase outflow passage 14, and the gas-phase outflow passage 13 are connected to the main body portion 81. The inflow passage 12 is a passage that connects the first heat exchanger 34 to the reservoir 36. The inflow passage 12 is connected to an inlet port 81a provided in the main body portion 81. The liquid-phase outflow passage 14 is a flow passage that connects the reservoir 36 to the second heat exchanger 35. The liquid-phase outflow passage 14 is connected to a liquid-phase outlet port 81c provided in the main body portion 81. The liquid-phase refrigerant flowing out from the liquid-phase outflow passage 14 flows into the second heat exchanger 35. The gas-phase outflow passage 13 is a flow passage that allows gas-phase refrigerant to flow out from the reservoir 36. The gas-phase outflow passage 13 is connected to a gas-phase outlet port 81b provided in the main body portion 81.

The second heat exchanger 35 has a header tank 351, a downstream core 352, and a header tank 353. The liquid-phase outflow passage 14 is connected to the header tank 351. The header tank 351 is provided at the upstream end of the downstream core 352. At the downstream end of the downstream core 352, the header tank 353 is provided. An outflow passage 15 is connected to the header tank 353.

Liquid-phase refrigerant flows from the header tank 351 to the downstream core 352. The downstream core 352 is a part that exchanges heat between the refrigerant flowing therein and the air flowing outside, and includes tubes through which the refrigerant flows and fins provided between the tubes. Accordingly, the liquid-phase refrigerant flowing into the downstream core 352 is directed to the header tank 353 while being subcooled.

The liquid-phase refrigerant flowing into the header tank 353 from the downstream core 352 then flows out to the outflow passage 15. The outflow passage 15 is connected to an expansion valve included in the refrigeration cycle device, and an evaporator is connected before the expansion valve.

In the present embodiment, the header tank 341 and the header tank 353 are formed by partitioning an integrally formed tank with a partitioning portion 356. Similarly, the header tank 343 and the header tank 351 are formed by partitioning an integrally formed tank with the partitioning portion 356.

The liquid-phase outflow passage 14 is connected to the reservoir 36 on the lower side, and the inflow passage 12 is connected at a higher point as compared to the liquid-phase outflow passage 14. The inflow passage 12 is connected at a point higher than the middle of the reservoir 36 in the longitudinal direction. In FIG. 4, the height of the reservoir 36 is the height until the lower end 90 of the fourth outlet port 74. The height of the reservoir 36 is defined as a height limit at which liquid refrigerant can be substantially stored.

Figure 6:
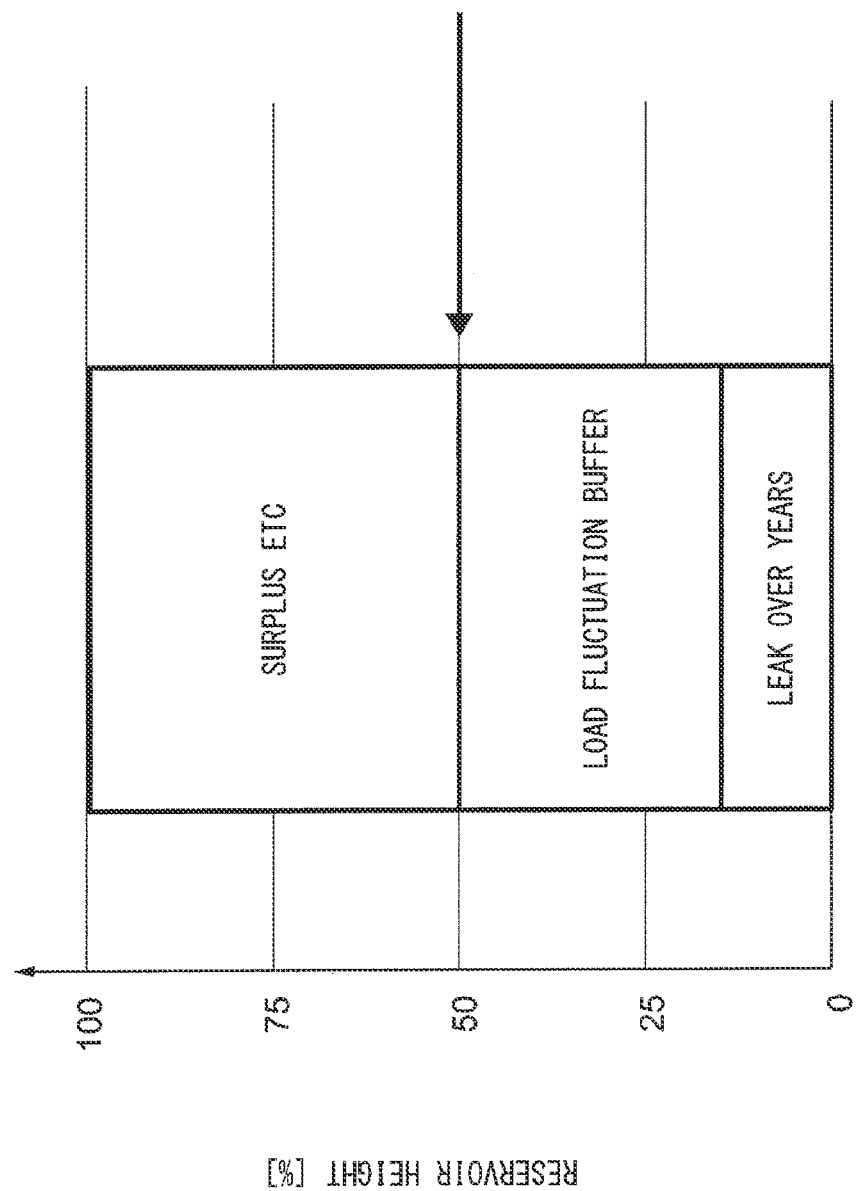
FIG. 6 is a view for explaining the liquid surface height inside a reservoir.

As shown in FIG. 6, the height of the reservoir 36 is set by stack up "leak over years", "load fluctuation buffer", "surplus etc." on top of each other. "Leakage over years" refers to an expected amount of refrigerant that leaks from various parts over a number of years of use when the heat exchanger 2 is used for the refrigeration cycle. "Load fluctuation buffer" is an expected amount of fluctuation in the amount of liquid-phase refrigerant that flows in during the operation of the refrigeration cycle. Since the combined height of "leakage over years" and "load fluctuation buffer" is liquid surface height required in the design of the reservoir 36, the inflow passage 12 is preferably provided above this height.

Figure 7:
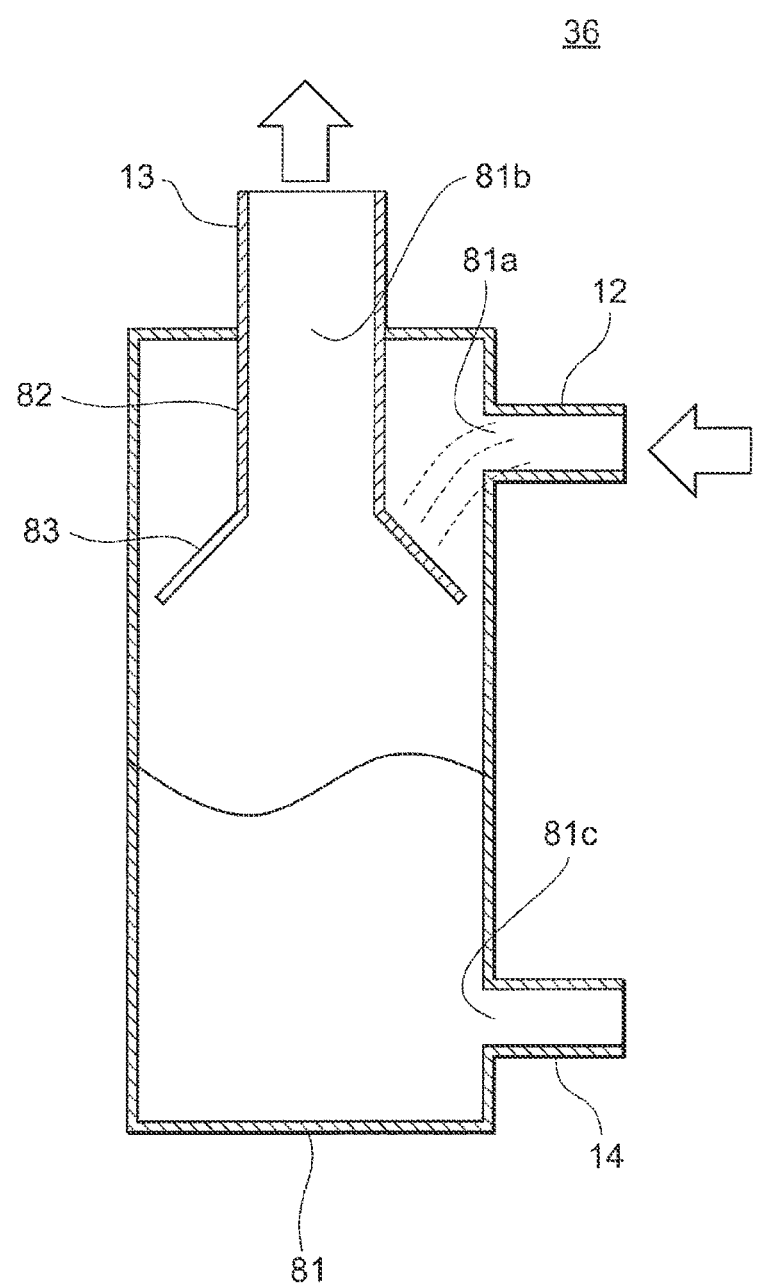
FIG. 7 is a view for explaining the interior of a reservoir.

As shown in FIG. 7, a partition portion 82 and a buffer portion 83 are provided in the main body portion 81 of the reservoir 36. The partition portion 82 is a cylindrical portion extending downward from the gas-phase outflow passage 13. The buffer portion 83 is connected to the lower end of the partition portion 82 and is provided so as to gradually increase in diameter from the lower end of the partition portion 82.

During the cooling operation, in the case where the incoming refrigerant from the inflow passage 12 is substantially liquid-phase refrigerant, the incoming refrigerant will hit the buffer portion 83 and then continue toward the liquid surface. Therefore, the refrigerant does not directly hit the liquid surface of the liquid-phase refrigerant accumulated inside, and disturbances of the liquid surface can be suppressed.

Figure 8:
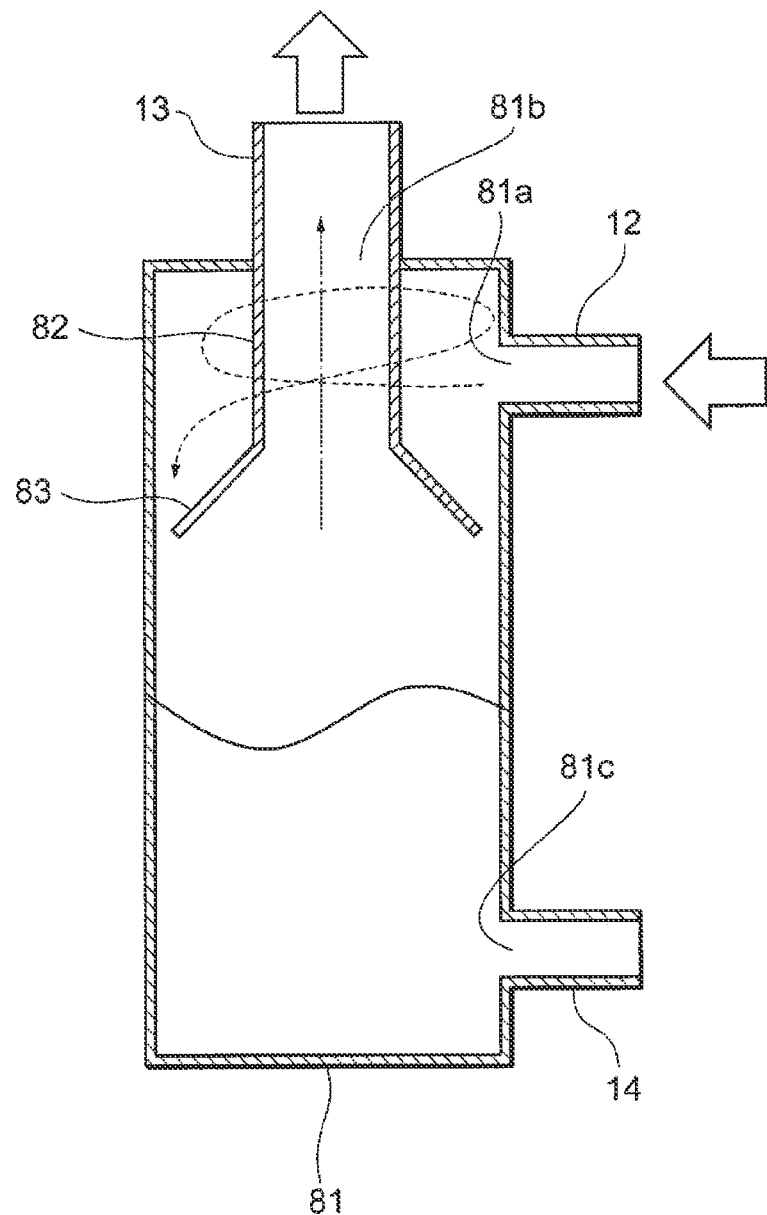
FIG. 8 is a view for explaining the interior of a reservoir.

As shown in FIG. 8, during the heating operation, when the refrigerant flowing in from the inflow passage 12 is substantially gas-phase refrigerant, gas-liquid separation is performed while swirling around the partition portion 82. The gas-liquid separated liquid-phase refrigerant falls down while hitting the buffer section 83. Therefore, the refrigerant does not directly hit the liquid surface of the liquid-phase refrigerant accumulated inside, and disturbances of the liquid surface can be suppressed. Since the liquid-phase refrigerant may be separated in this manner, the gas-phase refrigerant enters the partition portion 82 from the lower end of the buffer portion 83 and flows out from the gas-phase outflow passage 13.

Figure 9:
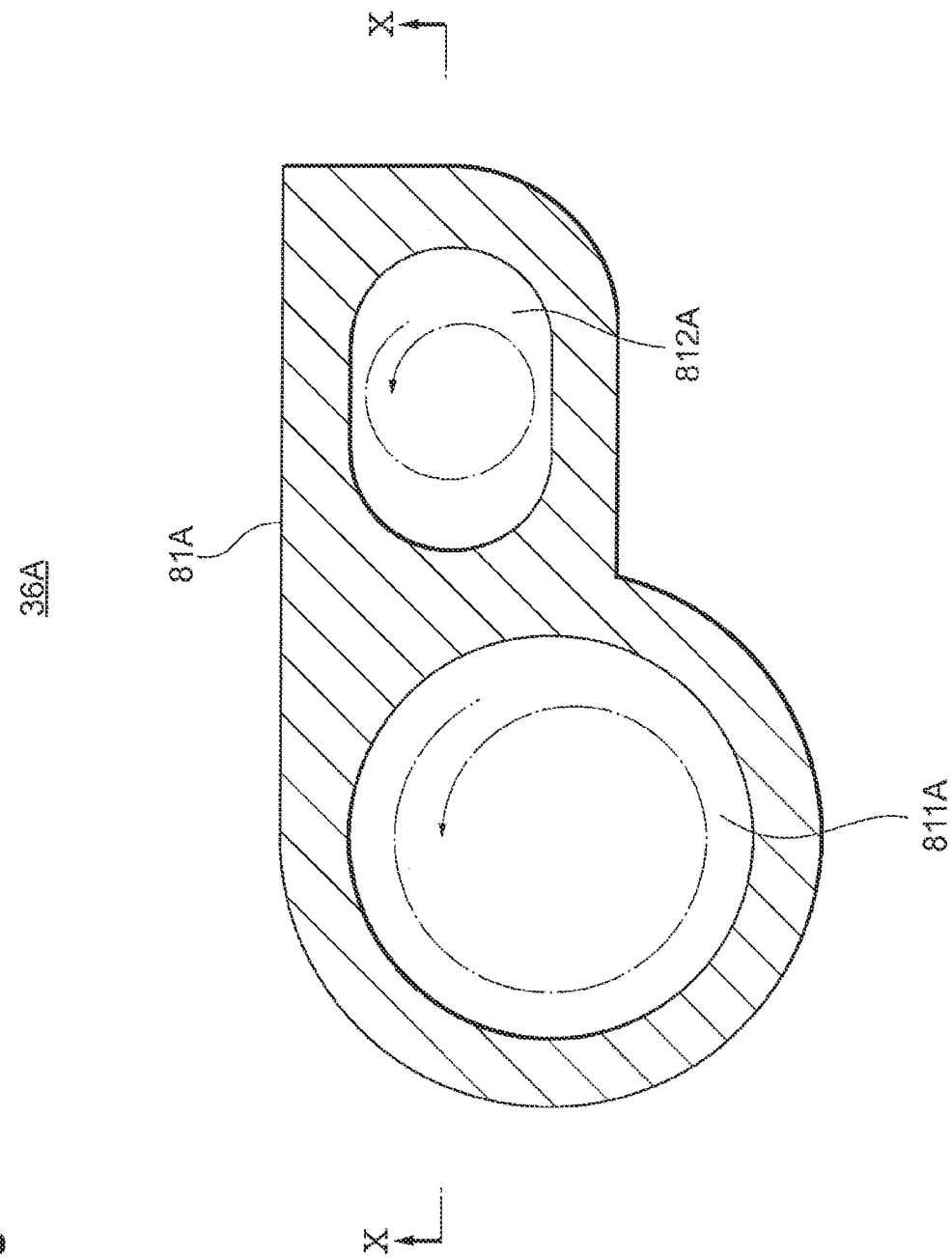
FIG. 9 is a view for explaining a reservoir according to a second embodiment.
Figure 10:
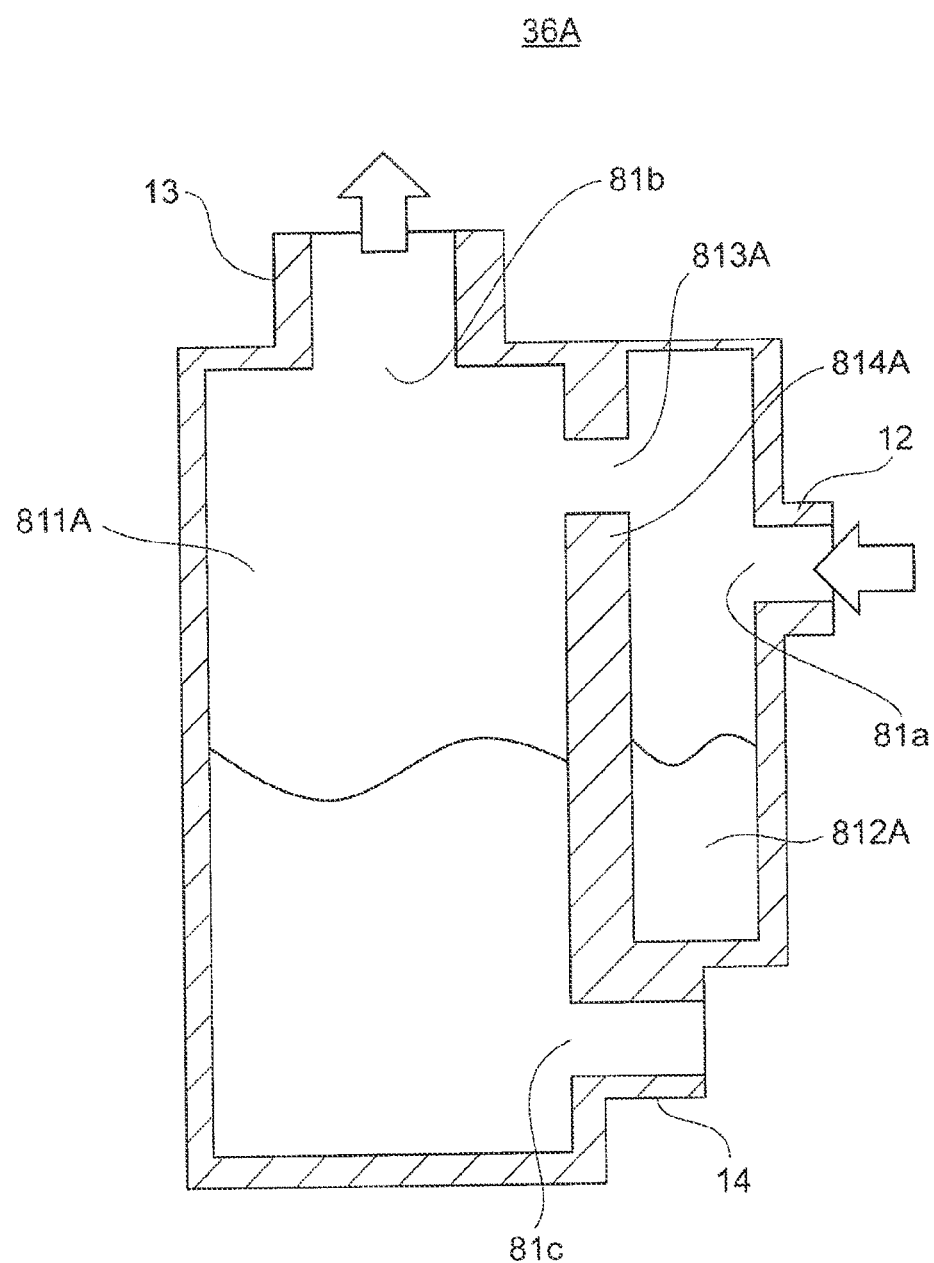
FIG. 10 is a cross-sectional view taken along line X-X of FIG. 9.

From the viewpoint of suppressing disturbances of the liquid surface, as shown in FIGS. 9 and 10, in a reservoir 36A of a second embodiment, the interior of the reservoir 36A is preferably divided into a plurality of spaces. A main reservoir space 811A and an auxiliary reservoir space 812A are formed in a main body portion 81A of the reservoir 36A.

As shown in FIG. 10, when the refrigerant flows in from the inflow passage 12, the refrigerant is distributed to the main reservoir space 811A and the auxiliary reservoir space 812A, and the liquid-phase refrigerant is stored. In the present embodiment, a partition wall 814A for partitioning the main reservoir space 811A from the auxiliary reservoir space 812A is provided high enough to face the inflow passage 12, and a communication passage 813A is provided above the partition wall 814A. The partition wall 814A is not necessarily provided at a position high enough to face the inflow passage 12, and may be provided to a lower position instead.

Figure 11:
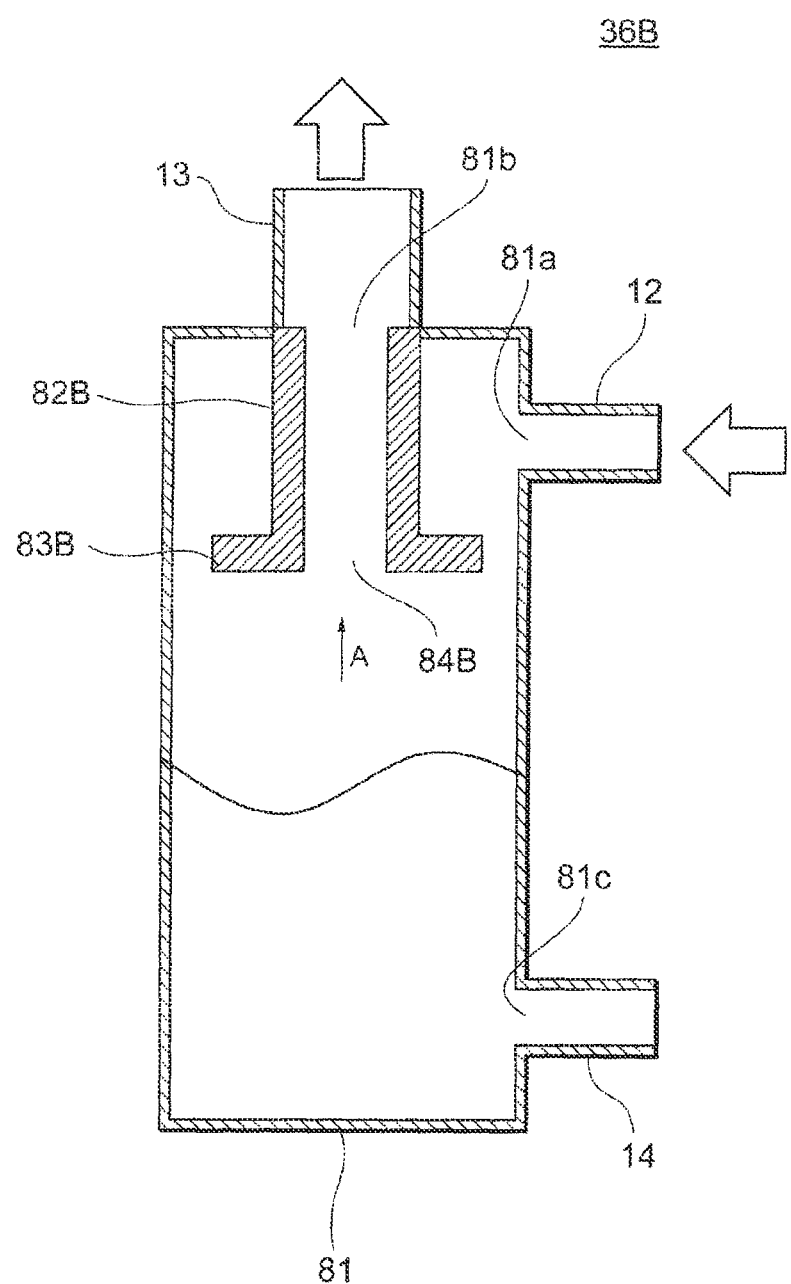
FIG. 11 is a view for explaining a reservoir according to a third embodiment.

In a reservoir 36B according to a third embodiment shown in FIG. 11, a partition portion 82B and a buffer portion 83B are provided in the main body portion 81. The partition portion 82B is a cylindrical portion extending downward from the gas-phase outflow passage 13. The buffer portion 83B is connected to the lower end of the partition portion 82B, and is configured as a disk-shaped member.

Figure 12:
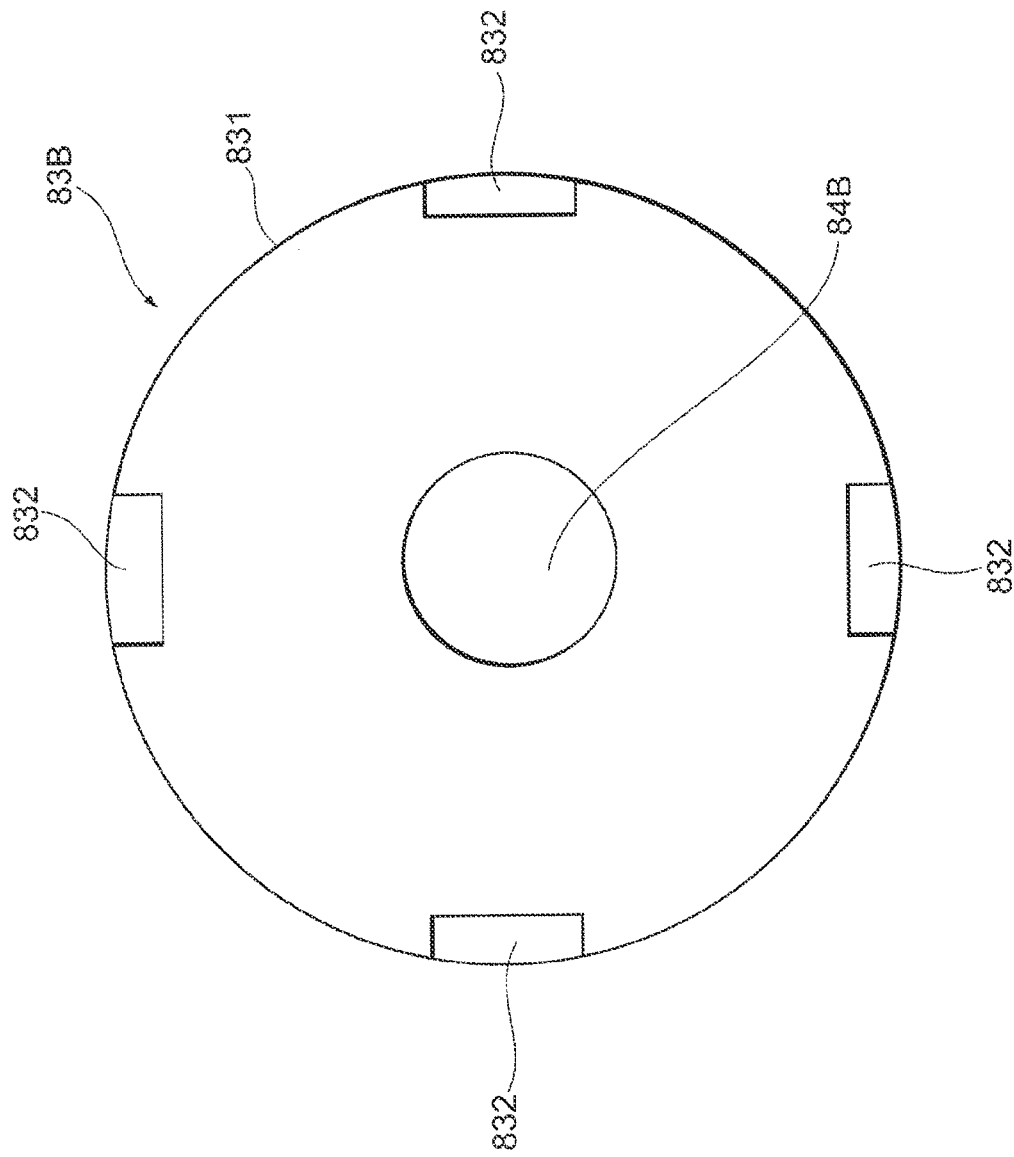
FIG. 12 is a view for explaining a reservoir according to a third embodiment.

As shown in FIG. 12, which is a view along the direction of the arrow A in FIG. 11, the disk-like buffer portion 83B is formed by a disk member 831. The disk member 831 is provided with an outflow hole 84B connected to the gas-phase outflow passage 13. Four notches 832 are provided along the periphery of the disk member 831.

Figure 13:
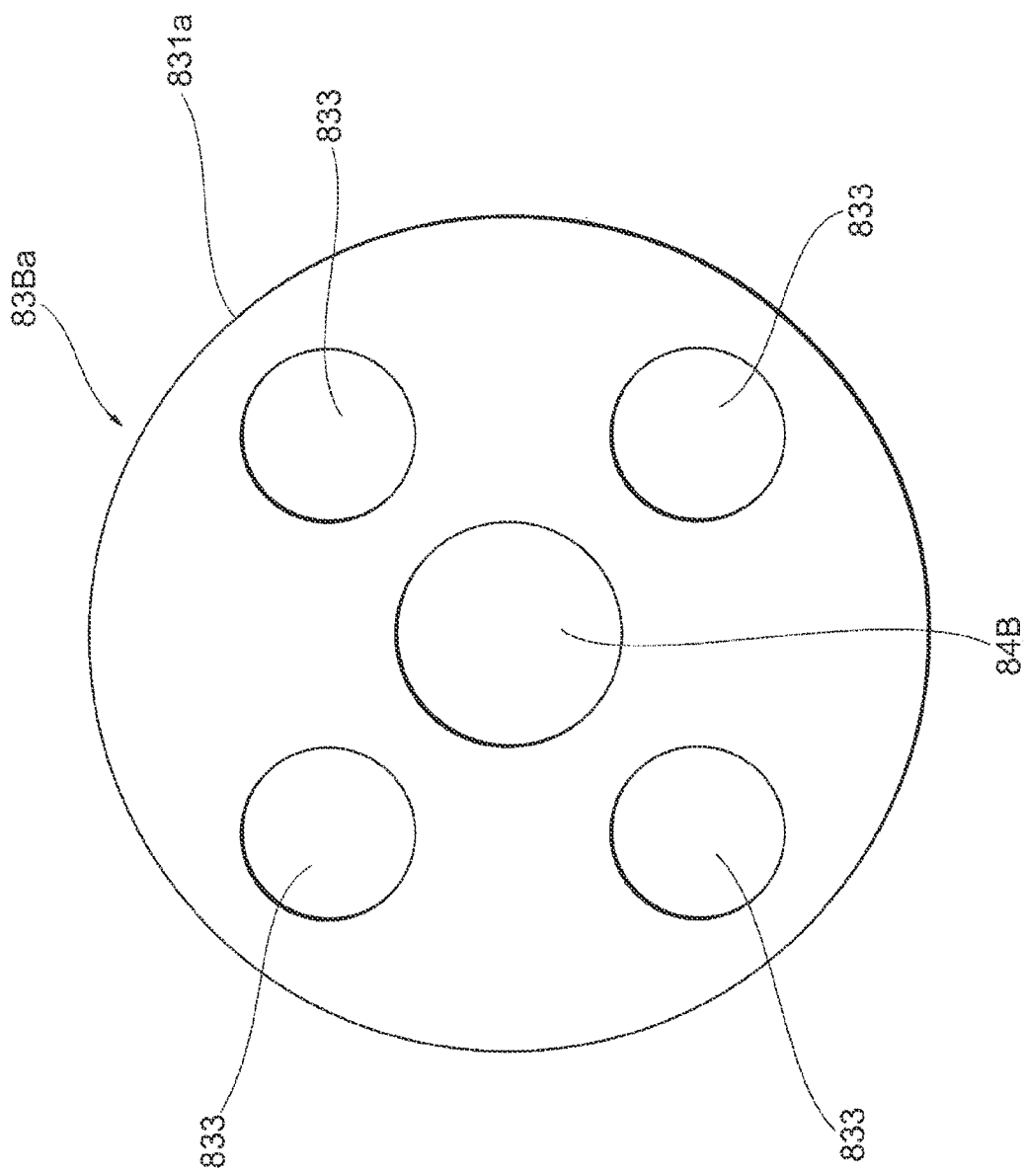
FIG. 13 is a view for explaining a reservoir according to a modified example of the third embodiment.

As a modified example, a buffer portion 83Ba as shown in FIG. 13 may be formed by a disc member 831a. The disk member 831a, is provided with four dropdown holes 833 around the outflow hole 84B. In this manner, it is possible to stop the swirling flow of the gas-liquid two-phase refrigerant flowing in from the inflow passage 12 while suppressing any gas-liquid separated liquid-phase refrigerant from directly hitting the liquid surface. Accordingly, gas-phase refrigerant can be sent out to the gas-phase outflow passage 13.

Figure 14:
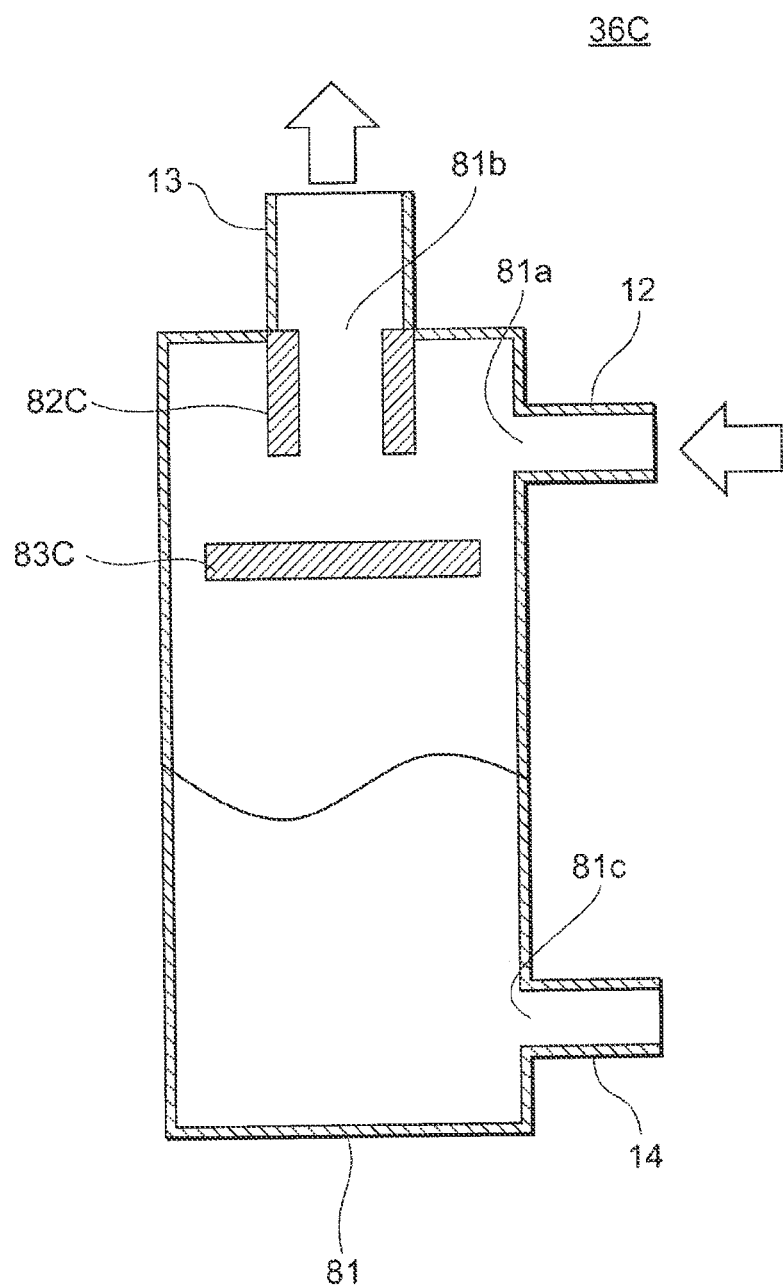
FIG. 14 is a view for explaining a reservoir according to a fourth embodiment.

FIG. 14 shows a reservoir 36C according to a fourth embodiment. The reservoir 36C is provided with a partition portion 82C and a buffer portion 83C in the main body portion 81. The partition portion 82C is a cylindrical portion extending downward from the gas-phase outflow passage 13. The buffer portion 83C is provided below the partition portion 82C, and is a plate member extending from the inner wall of the main body portion 81.

Figure 15:
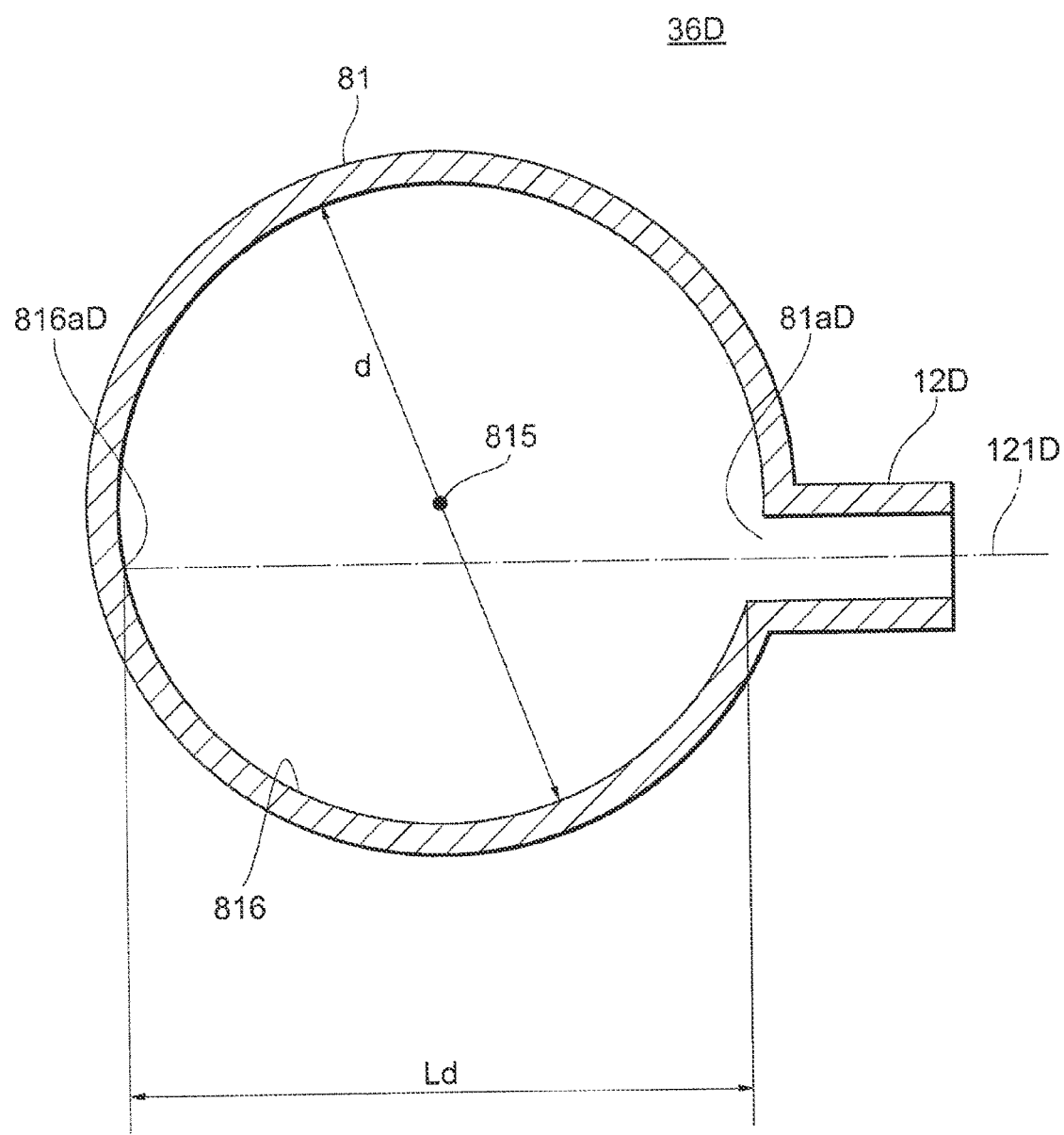
FIG. 15 is a view for explaining a reservoir according to a fifth embodiment.

FIG. 15 is a cross-sectional view taken along a cross section orthogonal to the axis passing through a center 815, which is the central axis of a reservoir 36D in the longitudinal direction according to a fifth embodiment. According to the reservoir 36D, the mounting position and the mounting angle of an inflow passage 12D with respect to the main body 81 is designed so as to reduce disturbances in the liquid surface caused by liquid-phase refrigerant flowing into and vigorously hitting the accumulated liquid-phase refrigerant.

The inflow passage 12D is provided with respect to the main body portion 81 such that if the inflow passage 12D is extended along a center line 121D, the inflow passage 12D does not pass through the center 815 of the reservoir 36D. As shown in the cross section view of FIG. 15, the center line 121D of the inflow passage 12D is a line that substantially equally divides the width of the inflow passage 12D along the flow direction of the refrigerant.

The inflow passage 12D is provided such that the gas-liquid two-phase refrigerant which flows through the inflow passage 12D then flows in from an inlet port 81aD collides with an inner wall surface 816 of the reservoir 36D and then falls into the liquid-phase refrigerant stored in the reservoir.

The reservoir 36D is provided such that a distance Ld from the inflow port 81aD to an inner wall surface portion 816aD of the reservoir 36D which faces the inflow port 81aD is shorter than a distance d between the farthest portions of the inner wall surface 816 of the reservoir 36D.

Since the main body portion 81 is substantially cylindrical, the center 815 is the center of the circular cross section. The distance d between the farthest portions of the inner wall surface 816 of the reservoir 36D is the diameter of the inner wall surface 816. Accordingly, the inner wall surface 816 of the reservoir 36D has a substantially circular cross section, and the distance Ld from the inflow port 81aD to the inner wall surface 816aD of the reservoir 36D which faces the inflow port 81aD is shorter than the diameter d of the inner wall surface 816.

Figure 16:
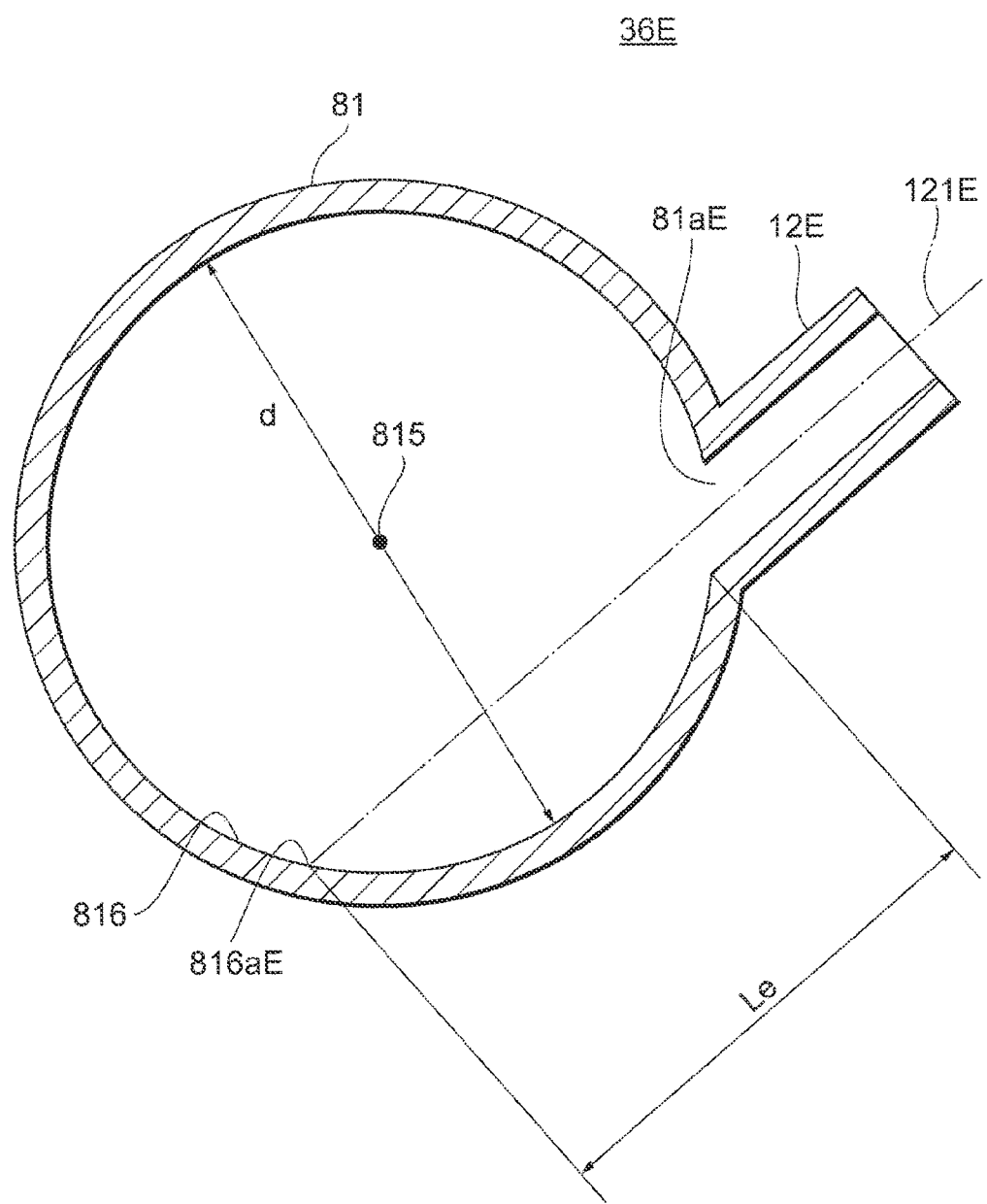
FIG. 16 is a view for explaining a reservoir according to a modified example of the fifth embodiment.

FIG. 16 shows a reservoir 36E according to a modified example of the fifth embodiment. In the reservoir 36E, an inflow port 81aE is placed further upward as compared to the inflow port 81aD shown in FIG. 15. When only considering the position of the inflow port 81aE, the inflow port 81aE is located at a position that directly faces toward the center 815 of the main body portion 81. However, by changing the angle of an inflow passage 12E, the inflow passage 12E is provided with respect to the main body portion 81 such that if a center line 121E of the inflow passage 12E is extended, the inflow passage 12E does not pass through the center 815 of the reservoir 36E.

The inflow passage 12E is provided such that the gas-liquid two-phase refrigerant which flows through the inflow passage 12E then flows in from the inlet port 81aE collides with the inner wall surface 816 of the reservoir 36E and then falls into the liquid-phase refrigerant stored in the reservoir 36E.

The reservoir 36E is provided such that a distance Le from the inflow port 81aE to an inner wall surface portion 816aE of the reservoir 36E which faces the inflow port 81aE is shorter than a distance d between the farthest portions of the inner wall surface 816 of the reservoir 36E.

Since the main body portion 81 is substantially cylindrical, the center 815 is the center of the circular cross section. The distance d between the farthest portions of the inner wall surface 816 of the reservoir 36E is the diameter of the inner wall surface 816. Accordingly, the inner wall surface 816 of the reservoir 36E has a substantially circular cross section, and the distance Le from the inflow port 81aE to the inner wall surface 816aE of the reservoir 36E which faces the inflow port 81aE is shorter than the diameter d of the inner wall surface 816.

Figure 17:
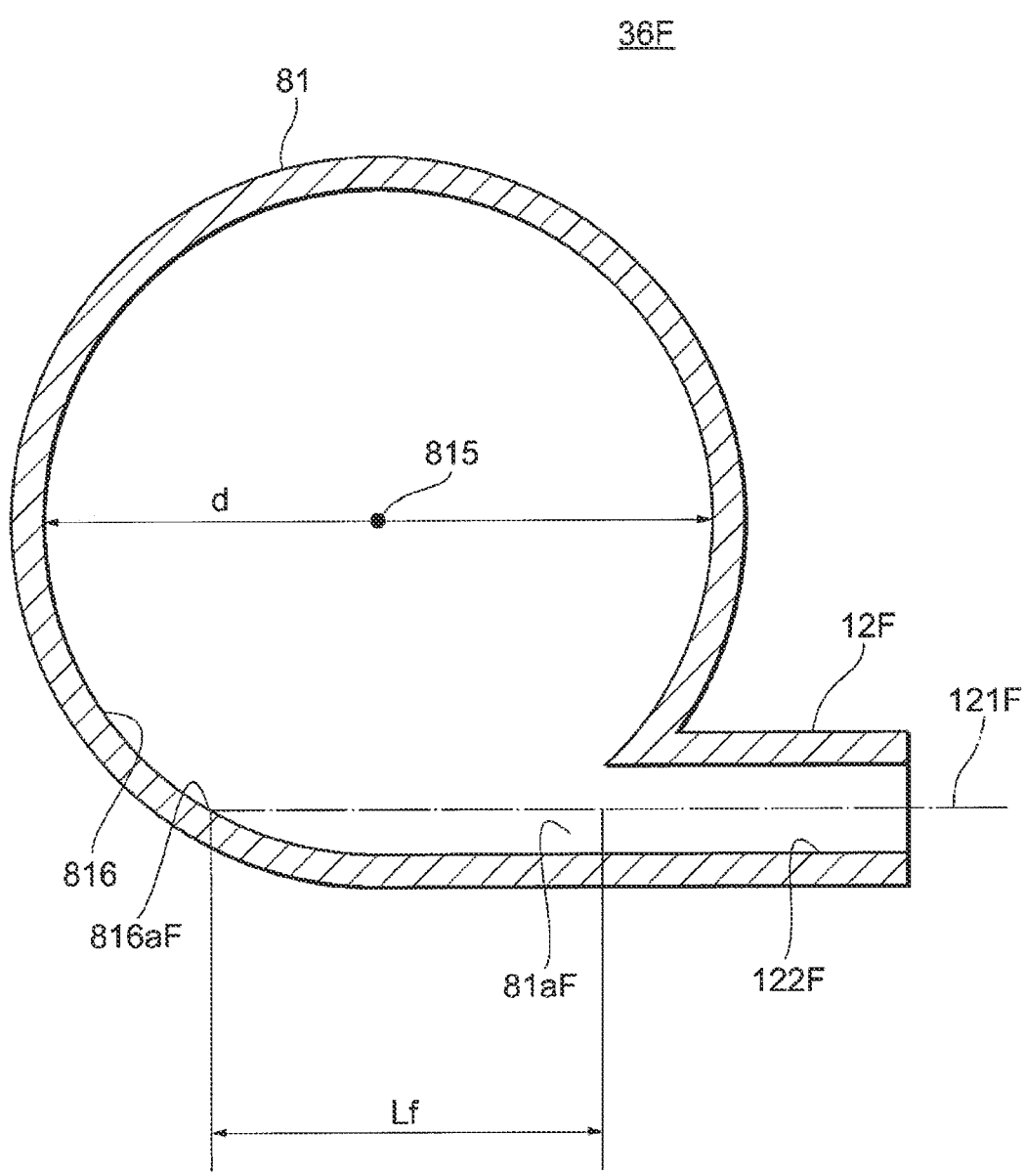
FIG. 17 is a view for explaining a reservoir according to a modified example of the fifth embodiment.

FIG. 17 shows a reservoir 36F according to a modified example of the fifth embodiment. In the reservoir 36F, an inflow port 81aF is moved downward in the figure as compared to the inflow port 81aD shown in FIG. 15. Similarly, an inflow passage 12F is also moved downward in the figure. Here, by moving the inflow passage 12F downward in the figure and without changing the angle of the inflow passage 12F, the inflow passage 12F is provided with respect to the main body portion 81 such that if a center line 121F of the inflow passage 12F is extended, the inflow passage 12F does not pass through the center 815 of the reservoir 36F.

The inflow passage 12F is provided such that the gas-liquid two-phase refrigerant which flows through the inflow passage 12F then flows in from the inlet port 81aF collides with the inner wall surface 816 of the reservoir 36F and then falls into the liquid-phase refrigerant stored in the reservoir 36F.

The reservoir 36F is provided such that a distance Lf from the inflow port 81aF to an inner wall surface portion 816aF of the reservoir 36F which faces the inflow port 81aF is shorter than a distance d between the farthest portions of the inner wall surface 816 of the reservoir 36F.

The inner wall surface 816 of the reservoir 36F has a substantially circular cross section, and the distance Lf from the inflow port 81aF to the inner wall surface 816aF of the reservoir 36F which faces the inflow port 81aF is shorter than the diameter d of the inner wall surface 816.

Further, a part of the inner wall surface 122F of the inflow passage 12F is disposed so as to follow the tangent of the inner wall surface 816 of the reservoir 36F.

Figure 18:
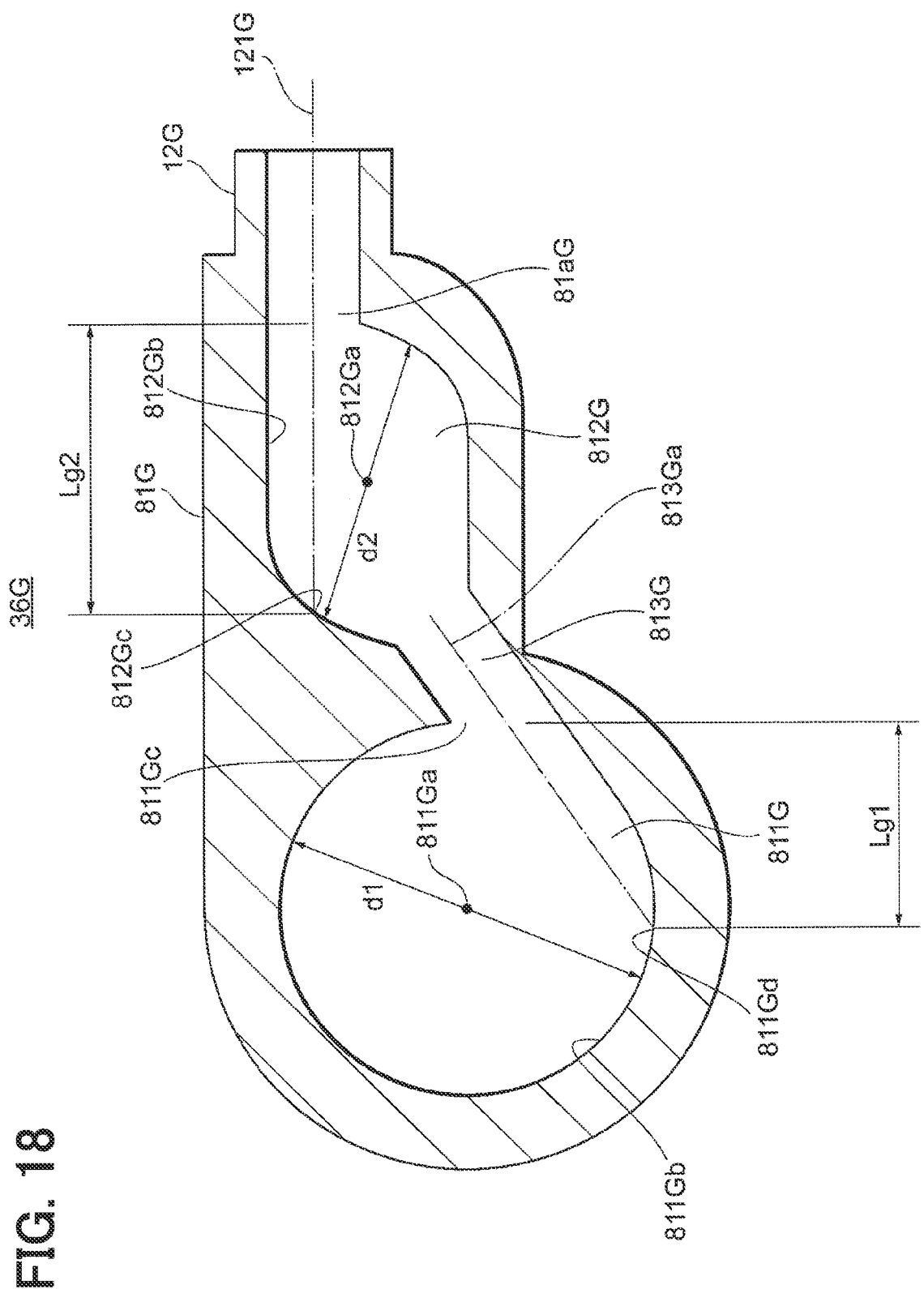
FIG. 18 is a view for explaining a reservoir according to a modified example of the second embodiment.

Similar to the reservoir 36A described with reference to FIGS. 9 and 10, the same effects can be obtained by designing the arrangement of the inflow passage 12. FIG. 18 shows a reservoir 36G as a modified example of the reservoir 36A, and shows a cross section corresponding to the cross section shown in FIG. 9.

An inflow passage 12G is provided with respect to a main body portion 81G such that if a center line 121G of the inflow passage 12G is extended, the center line 121G does not pass through a center 812Ga of an auxiliary reservoir space 812G. As shown in the cross section view of FIG. 18, the center line 121G of the inflow passage 12G is a line that substantially equally divides the width of the inflow passage 12G along the flow direction of the refrigerant.

The inflow passage 12G is provided such that the gas-liquid two-phase refrigerant which flows through the inflow passage 12G then flows in from an inlet port 81aG collides with an inner wall surface 812Gb of the auxiliary reservoir space 812G, and then falls into the liquid-phase refrigerant stored in the auxiliary reservoir space 812G.

The auxiliary reservoir space 812G is provided such that a distance Lg2 from the inflow port 81aG to an opposing inner wall surface 812Gc is shorter than a distance d2 between the farthest portions of the inner wall surface 812Gb of the auxiliary reservoir space 812G.

The arrangement of a communication passage 813G that connects the auxiliary reservoir space 812G to a main reservoir space 811G may be designed similarly to the arrangement of the inflow passage 12G. The communication passage 813G is provided such that if a center line 813Ga of the communication passage 813G is extended, the center line 813Ga does not pass through a center 811Ga of the main reservoir space 811G. As shown in the cross section view of FIG. 18, the center line 813Ga of the communication passage 813G is a line that substantially equally divides the width of the communication passage 813G along the flow direction of the refrigerant.

Since the main reservoir space 811G is substantially cylindrical, the center 811Ga is the center of the circular cross section. The distance d1 between the farthest portions of an inner wall surface 811Gb of the main reservoir space 811G is the diameter of the inner wall surface 811Gb. Accordingly, the inner wall surface 811Gb has a substantially circular cross section, and a distance Lg1 from the inlet port 811Gc connected to the main reservoir space 811G to an inner wall surface portion 811Gd that faces the inlet port 811Gc is shorter than the diameter d1 of the inner wall surface 811Gb.

As described above, the heat exchanger 300 according to the present embodiment includes the first heat exchanger 34 which is an upstream heat exchanging portion that exchanges heat between a refrigerant passing through therein and air, the reservoir 36, 36A, 36B, 36C, 36D, 36E, 36F, 36G that performs gas-liquid separation on a gas-liquid two-phase refrigerant that flows out from the first heat exchanger 34 into a gas-phase refrigerant and a liquid-phase refrigerant, the reservoir 36, 36A, 36B, 36C, 36D, 36E, 36F, 36G storing the liquid-phase refrigerant, the inflow passage 12, 12D, 12E, 12F, 12G that allows the gas-liquid two-phase refrigerant flowing out from the first heat exchanger 34 to flow into the reservoir 36, 36A, 36B, 36C, 36D, 36E, 36F, 36G, the gas-phase outflow passage 13 that allows the gas-phase refrigerant to flow out from the reservoir 36, 36A, 36B, 36C, 36D, 36E, 36F, 36G, and the liquid-phase outflow passage 14 that allows the liquid-phase refrigerant to flow out from the reservoir 36, 36A, 36B, 36C, 36D, 36E, 36F, 36G. The inflow passage 12, 12D, 12E, 12F, 12G is connected so as to be in communication with the inlet port 81a, 81aD, 81aE, 81aF, 81aG which is disposed above a liquid surface of the liquid-phase refrigerant stored in the reservoir 36, 36A, 36B, 36C, 36D, 36E, 36F, 36G, the gas-phase outflow passage 13 is connected so as to be in communication with a gas-phase outlet port 81b which is disposed above the liquid surface of the liquid-phase refrigerant stored in the reservoir 36, 36A, 36B, 36C, 36D, 36E, 36F, 36G, and the liquid-phase outflow passage 14 is connected so as to be in communication with a liquid-phase outlet port 81c which is disposed below the liquid surface of the liquid-phase refrigerant stored in the reservoir 36, 36A, 36B, 36C, 36D, 36E, 36F, 36G.

According to the present embodiment, since the refrigerant flows in from above the liquid surface, gas-phase refrigerant does not flow into the liquid-phase refrigerant stored in the reservoir, and it is possible to suppress disturbances in the liquid surface.

Further, according to the present embodiment, the reservoir 36, 36A, 36B, 36C, 36D, 36E, 36F, 36G includes the partition portion 82, 82B, 82C between the inlet port 81a and the gas-phase outlet port 81b.

By providing a partition portion between the inlet port and the gas-phase outlet port, the refrigerant flowing in from the inlet port hits the partition portion before flowing out from the gas-phase outlet port, and continues downward. Therefore, it is possible to suppress the liquid-phase refrigerant from flowing out of the gas-phase outlet port 81b.

Further according to the present embodiment, the partition portion 82, 82B, 82C is disposed such that at least a portion thereof faces the inlet port 81a. Due to this facing arrangement, it is possible to ensure that the refrigerant flowing in from the inlet port 81a collides with the partition portion 82, 82B, 82C.

Further according to the present embodiment, the buffer portion 83, 83B, 83C is provided between the inlet port 81a and the liquid surface of the liquid-phase refrigerant. By providing the buffer portion 83, 83B, 83 C, it is possible to prevent the refrigerant flowing in from the inlet port 81a from directly falling onto the liquid surface, and it is possible to reduce disturbances of the liquid surface.

Further according to the present embodiment, at least part of the buffer portion 83, 83B, 83C is arranged between the inlet port 81a and the liquid-phase outlet port 81c, and is disposed closer toward the liquid surface as compared to the inlet port 81a. Due to this positioning, the liquid-phase refrigerant flowing in from the inlet port 81a will more reliably collide with the buffer portion 83, 83B, 83C, and it is possible to prevent disturbances in the liquid surface.

In the present embodiment, the reservoirs 36, 36B, 36C each have a substantially cylindrical main body portion 81 capable of storing the liquid-phase refrigerant therein, and the body portions 81 to the inner wall is preferably equal to or less than one-third of the radius of the main body 81.

With such a configuration, it is possible to suppress disturbances in the liquid surface.

Further according to the present embodiment, the inflow passage 12D, 12E, 12F, 12G is disposed such that if the center line 121D, 121E, 121F, 121G of the inflow passage 12D, 12E, 12F, 12G is extended, the center line 121D, 121E, 121F, 121G reaches the inner wall surface 816, 812Gb of the reservoir 36D, 36E, 36F, 36G without passing through the center 815, 812Ga of the reservoir 36D, 36E, 36F, 36G.

With such a configuration, the gas-liquid two-phase refrigerant flowing in from the inflow passage 12D, 12E, 12F, 12G is able to hit the inner wall surface 816, 812Gb of the reservoir 36D, 36E, 36F, 36G and then fall down. Accordingly, it is possible to prevent the incoming refrigerant from directly falling into the liquid-phase refrigerant stored in the reservoir 36D, 36E, 36F, 36G, thereby suppressing disturbances in the liquid surface of the liquid-phase refrigerant.

Further according to the present embodiment, the inflow passage 12D, 12E, 12F, 12G is provided such that the gas-liquid two-phase refrigerant which flows through the inflow passage 12D, 12E, 12F, 12G then flows in from the inlet port 81aD, 81aE, 81aF, 81aG collides with the inner wall surface 816, 812Gb of the reservoir 36D, 36E, 36F, 36G and then falls into the liquid-phase refrigerant stored in the reservoir 36D, 36E, 36F, 36G.

With such a configuration, the gas-liquid two-phase refrigerant flowing in from the inflow passage 12D, 12E, 12F, 12G is able to reliably hit the inner wall surface 816, 812Gb of the reservoir 36D, 36E, 36F, 36G and then fall down.

Further according to the present embodiment, the distance Ld, Le, Lf, Lg1, Lg2 from the inlet port 81aD, 81aE, 81aF, 81aG to an inner wall surface portion 816aD, 816aE, 816aG, 811Gd, 812Gc of the reservoir 36D, 36E, 36F, 36G that faces the inlet port 81aD, 81aE, 81aF, 81aG is shorter than a distance d, d1, d2 between the farthest portions of the inner wall surface of the reservoir 36D, 36E, 36F, 36G.

With such a configuration, the gas-liquid two-phase refrigerant flowing in from the inflow passage 12D, 12E, 12F, 12G is able to reliably hit the inner wall surface 816, 812Gb of the reservoir 36D, 36E, 36F, 36G and then fall down.

Further according to the present embodiment, the inner wall surface 816, 812Gb of the reservoir 36D, 36E, 36F, 36G has a substantially circular cross section, and the distance Ld, Le, Lf, Lg1 from the inlet port 81aD, 81aE, 81aF, 81aG to the inner wall surface portion 816aD, 816aE, 816aG, 811Gd of the reservoir 36D, 36E, 36F, 36G that faces the inlet port 81aD, 81aE, 81aF, 81aG is shorter than the diameter d, d1 of the reservoir 36D, 36E, 36F, 36G.

With such a configuration, the incoming gas-liquid two-phase refrigerant is able to reliably hit the inner wall surface 816, 811Gb of the reservoir 36D, 36E, 36F, 36G and then fall down.

Further according to the present embodiment, a part of the inner wall surface 122F of the inflow passage 12F is disposed so as to follow the tangent of the inner wall surface 816 of the reservoir 36F.

With such a configuration, the incoming gas-liquid two-phase refrigerant is able to reliably hit the inner wall surface 816 of the reservoir 36F and then fall down.

The present embodiments have been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

The invention claimed is:

1. A heat exchanger for a refrigeration cycle, comprising:
a heat exchanging portion that exchanges heat between a refrigerant passing through therein and air;
a reservoir that performs gas-liquid separation on a gas-liquid two-phase refrigerant that flows out from the heat exchanging portion into a gas-phase refrigerant and a liquid-phase refrigerant, the reservoir storing the liquid-phase refrigerant;
a single inflow passage that allows the gas-liquid two-phase refrigerant flowing out from the heat exchanging portion to flow into the reservoir;
a gas-phase outflow passage that allows the gas-phase refrigerant to flow out from the reservoir; and
a liquid-phase outflow passage that allows the liquid-phase refrigerant to flow out from the reservoir; wherein
the reservoir is configured to function as a receiver during a cooling operation of the refrigeration cycle and to function as an accumulator during a heating operation of the refrigeration cycle,
the inflow passage is connected so as to be in communication with a single inlet port of the reservoir disposed above a liquid surface of the liquid-phase refrigerant stored in the reservoir,
the gas-phase outflow passage is connected so as to be in communication with a gas-phase outlet port of the reservoir disposed above the liquid surface of the liquid-phase refrigerant stored in the reservoir, the gas-phase outlet port being disposed so as to be connected to a compressor included in the refrigeration cycle,
the liquid-phase outflow passage is connected so as to be in communication with a liquid-phase outlet port of the reservoir disposed below the liquid surface of the liquid-phase refrigerant stored in the reservoir,
the inflow passage is connected at a point higher than middle of the reservoir in a height direction,
the inflow passage is disposed such that if a center line of the inflow passage is extended, the center line reaches an inner wall surface of the reservoir without passing through a center of the reservoir,
a distance from the inlet port to an inner wall surface portion of the reservoir that faces the inlet port is shorter than a distance between the farthest portions of the inner wall surface of the reservoir, and
wherein a distance of a pathway of refrigerant from the inlet port to the inner wall surface portion of the reservoir that faces the inlet port is shorter than a diameter of the reservoir.

2. The heat exchanger according to claim 1, wherein the inflow passage is provided such that the gas-liquid two-phase refrigerant which flows through the inflow passage then flows in from the inlet port collides with the inner wall surface of the reservoir and then falls into the liquid-phase refrigerant stored in the reservoir.

3. The heat exchanger according to claim 1, wherein the inner wall surface of the reservoir has a substantially circular cross section, and
the distance from the inlet port to the inner wall surface portion of the reservoir that faces the inlet port is shorter than a diameter of the reservoir.

4. The heat exchanger according to claim 3, wherein a part of an inner wall surface of the inflow passage is disposed so as to follow a tangent of the inner wall surface of the reservoir.

5. The heat exchanger according to claim 1, wherein the center line of the inflow passage reaches the inner wall surface of the reservoir without passing through the center of the reservoir in a cross section orthogonal to an axis passing through the center of the reservoir.

6. A heat exchanger for a refrigeration cycle, comprising:
a heat exchanging portion that exchanges heat between a refrigerant passing through therein and air;
a reservoir that performs gas-liquid separation on a gas-liquid two-phase refrigerant that flows out from the heat exchanging portion into a gas-phase refrigerant and a liquid-phase refrigerant, the reservoir storing the liquid-phase refrigerant;
a single inflow passage that allows the gas-liquid two-phase refrigerant flowing out from the heat exchanging portion to flow into the reservoir;
a gas-phase outflow passage that allows the gas-phase refrigerant to flow out from the reservoir; and
a liquid-phase outflow passage that allows the liquid-phase refrigerant to flow out from the reservoir; wherein
the reservoir is configured to function as a receiver during a cooling operation of the refrigeration cycle and to function as an accumulator during a heating operation of the refrigeration cycle,
the inflow passage is connected so as to be in communication with a single inlet port of the reservoir disposed above a liquid surface of the liquid-phase refrigerant stored in the reservoir,
the gas-phase outflow passage is connected so as to be in communication with a gas-phase outlet port of the reservoir disposed above the liquid surface of the liquid-phase refrigerant stored in the reservoir, the gas-phase outlet port being disposed so as to be connected to a compressor included in the refrigeration cycle,
the liquid-phase outflow passage is connected so as to be in communication with a liquid-phase outlet port of the reservoir disposed below the liquid surface of the liquid-phase refrigerant stored in the reservoir,
the inflow passage is connected at a point higher than a middle of the reservoir in a height direction,
the inflow passage is disposed such that if a center line of the inflow passage is extended, the center line reaches an inner wall surface of the reservoir without passing through a center of the reservoir in a cross section orthogonal to an axis passing through the center of the reservoir,
a distance of a pathway of refrigerant from the inlet port to an inner wall surface portion of the reservoir that faces the inlet port is shorter than a diameter of the reservoir, and
the inlet port is angled such that gas-liquid two-phase refrigerant flowing in from the inflow passage collides with the inner wall surface of the reservoir and then falls into the liquid-phase refrigerant stored in the reservoir.

7. The heat exchanger according to claim 6, wherein the inner wall surface of the reservoir has a substantially circular cross section.

8. The heat exchanger according to claim 6, wherein
a part of an inner wall surface of the inflow passage is disposed so as to follow a tangent of the inner wall surface of the reservoir.

\* \* \* \* \*